(12) United States Patent
Kang et al.

(10) Patent No.: US 12,433,925 B2
(45) Date of Patent: Oct. 7, 2025

(54) **COMPOSITION FOR PHOTODYNAMIC REACTION CONTAINING EXTRACT OF *LIGULARIA FISCHERI* AS AN EFFECTIVE INGREDIENT, ANTIMICROBIAL, ANTIFUNGAL AND STERILIZATION COMPOSITION INCLUDING THE SAME, AND STERILIZATION METHOD USING THE COMPOSITION FOR PHOTODYNAMIC REACTION**

(71) Applicant: KOREA INSTITUTE OF SCIENCE AND TECHNOLOGY, Seoul (KR)

(72) Inventors: Kyungsu Kang, Gangneung-si (KR); Jae Young Kwon, Gangneung-si (KR); Hak Cheol Kwon, Gangneung-si (KR); Jin Chul Kim, Gangneung-si (KR); Jin Soo Park, Gangneung-si (KR); Ho Seong Hwang, Gangneung-si (KR); Seemi Tasnim Alam, Gangneung-si (KR)

(73) Assignee: KOREA INSTITUTE OF SCIENCE AND TECHNOLOGY, Seoul (KR)

( * ) Notice: Subject to any disclaimer, the term of this patent is extended or adjusted under 35 U.S.C. 154(b) by 521 days.

(21) Appl. No.: 17/354,380

(22) Filed: Jun. 22, 2021

(65) Prior Publication Data
US 2021/0393723 A1    Dec. 23, 2021

(30) Foreign Application Priority Data
Jun. 23, 2020 (KR) .................... 10-2020-0076758

(51) Int. Cl.
| | | |
|---|---|---|
| *A61K 36/28* | (2006.01) | |
| *A01N 65/12* | (2009.01) | |
| *A23B 2/53* | (2025.01) | |
| *A23B 2/733* | (2025.01) | |
| *A23B 4/015* | (2006.01) | |
| *A23B 4/20* | (2006.01) | |
| *A23B 7/015* | (2006.01) | |
| *A23B 7/154* | (2006.01) | |
| *A61K 41/00* | (2020.01) | |
| *A61L 2/00* | (2006.01) | |
| *A61L 2/08* | (2006.01) | |
| *A61L 2/10* | (2006.01) | |
| *A61L 2/26* | (2006.01) | |
| *A61P 31/04* | (2006.01) | |
| *A61P 31/10* | (2006.01) | |
| *C02F 1/32* | (2023.01) | |
| *C02F 1/50* | (2023.01) | |
| *A61L 101/32* | (2006.01) | |

(52) U.S. Cl.
CPC ............. *A61K 36/28* (2013.01); *A01N 65/12* (2013.01); *A23B 2/53* (2025.01); *A23B 2/733* (2025.01); *A23B 4/015* (2013.01); *A23B 4/20* (2013.01); *A23B 7/015* (2013.01); *A23B 7/154* (2013.01); *A61K 41/0057* (2013.01); *A61L 2/0047* (2013.01); *A61L 2/0052* (2013.01); *A61L 2/0076* (2013.01); *A61L 2/084* (2013.01); *A61L 2/088* (2013.01); *A61L 2/10* (2013.01); *A61L 2/26* (2013.01); *A61P 31/04* (2018.01); *A61P 31/10* (2018.01); *C02F 1/325* (2013.01); *C02F 1/50* (2013.01); *A23V 2002/00* (2013.01); *A61K 2236/15* (2013.01); *A61K 2236/17* (2013.01); *A61K 2236/331* (2013.01); *A61K 2236/333* (2013.01); *A61L 2101/32* (2020.08); *A61L 2202/11* (2013.01); *A61L 2202/24* (2013.01); *C02F 2201/3222* (2013.01); *C02F 2303/04* (2013.01)

(58) Field of Classification Search
None
See application file for complete search history.

(56) References Cited

U.S. PATENT DOCUMENTS

| | | | |
|---|---|---|---|
| 9,301,989 B2 | 4/2016 | Rhyu et al. | |
| 2007/0299046 A1 | 12/2007 | Brooks et al. | |

FOREIGN PATENT DOCUMENTS

| | | |
|---|---|---|
| KR | 10-2003-0042344 A | 5/2003 |
| KR | 10-1995281 B1 | 7/2019 |
| WO | WO 2004/084817 A2 | 10/2004 |

OTHER PUBLICATIONS

Ansari (Molecules (Apr. 2019), vol. 24, p. 1586; 20 pages).*
Mima (Oral Surg Oral Med Oral Pathol Oral Radiol Endod (2010), vol. 109, pp. 392-401).*
Perez-Laguna (Frontiers in Microbiology (2017), vol. 8, article 1002, 9 pages).*
Lee et al., "The Antimicrobial Activity of Essential Oil from Dracocephalum foetidum against Pathogenic Microorganisms," The Journal of Microbiology, vol. 45, No. 1, Feb. 2007, pp. 53-57.
Korean Office Action for Korean Application No. 10-2020-0076758, dated Aug. 1, 2022, with an English translation.
Li et al., "Phaeophytin Analogues from Ligularia knorringiana," Molecules, vol. 17, 2012, pp. 5219-5224.

* cited by examiner

*Primary Examiner* — Susan Hoffman
(74) *Attorney, Agent, or Firm* — Birch, Stewart, Kolasch & Birch, LLP

(57) ABSTRACT

Provided are methods of reducing and killing bacteria and fungi, and photodynamic treatment methods and sterilization methods using the methods of reducing and killing bacteria and fungi. The method of reducing and killing bacteria and fungi includes bringing a composition including a *Ligularia fischeri* extract or a fraction thereof as an active ingredient into contact with cells or tissues of a subject and irradiating cells or tissues of a subject in contact with the composition with an absorbable wavelength of excitation light.

11 Claims, 18 Drawing Sheets

FIG. 12A

|  | DAY 0 | DAY 2 | DAY 4 | DAY 6 | DAY 8 |
|---|---|---|---|---|---|
| Control (PBS) | | | | | |
| PBS + Preparation Example 1(1) | | | | | |
| PBS + Red Light | | | | | |
| PBS + Preparation Example 1(1) + Red Light | | | | | |
| PBS + Ampicillin | | | | | |

FIG. 12B

|  | DAY 0 | DAY 2 | DAY 4 | DAY 6 | DAY 8 |
|---|---|---|---|---|---|
| S.A.Bacteria | | | | | |
| S.A.Bacteria + Preparation Example 1(1) | | | | | |
| S.A.Bacteria + Red Light | | | | | |
| S.A.Bacteria + Preparation Example 1(1) + Red Light | | | | | |
| S.A.Bacteria + Ampicillin | | | | | |

Black bar (scale bar = 200 μm), yellow bar: wound length, dotted line: epidermis.

COMPOSITION FOR PHOTODYNAMIC REACTION CONTAINING EXTRACT OF *LIGULARIA FISCHERI* AS AN EFFECTIVE INGREDIENT, ANTIMICROBIAL, ANTIFUNGAL AND STERILIZATION COMPOSITION INCLUDING THE SAME, AND STERILIZATION METHOD USING THE COMPOSITION FOR PHOTODYNAMIC REACTION

CROSS-REFERENCE TO RELATED APPLICATION

This application is based on and claims priority under 35 U.S.C. § 119 to Korean Patent Application No. 10-2020-0076758, filed on Jun. 23, 2020, in the Korean Intellectual Property Office, the disclosure of which is incorporated by reference here in its entirety.

BACKGROUND

1. Field

One or more embodiments relate to methods of reducing and killing bacteria and fungi, and photodynamic treatment methods and sterilization methods using the methods of reducing and killing bacteria and fungi.

2. Description of the Related Art

In recent years, antibacterial, fungal, and/or bactericidal techniques are required for a variety of applications. However, the use of excessive antibiotics, for example, frequently increases the incidence of antibiotic-resistant pathogens. Accordingly, as an alternative to a sterilization method using an antibiotic, proposed are a method of reducing and killing bacteria and fungi using a photodynamic reaction, and a photodynamic treatment method and a sterilization method that use the method of reducing and killing bacteria and fungi using a photodynamic reaction.

A method of reducing and killing bacteria and fungi using a photodynamic reaction is a method of using, together with light irradiation, a photosensitizer that responds to specific light.

In recent years, as such photosensitizers, studies are underway on edible food material compositions which have proven safety, instead of antibiotics. Among them, there are studies on edible food material compositions having proven safety for use in the inhibition or treatment of oral diseases and periodontal diseases or in the suppression or killing of acne and harmful skin bacteria.

Accordingly, there is a need for methods of reducing and killing bacteria and fungi using such edible food material compositions, and photodynamic treatment methods and sterilization methods using such methods of reducing and killing bacteria and fungi using edible food material compositions.

SUMMARY

One or more embodiments include a method of reducing and killing bacteria and fungi using a composition including a *Ligularia fischeri* extract or a fraction thereof as an active ingredient.

One or more embodiments include a photodynamic treatment method using the method.

One or more embodiments include a sterilization method using a composition including a *Ligularia fischeri* extract or a fraction thereof as an active ingredient.

Additional aspects will be set forth in part in the description which follows and, in part, will be apparent from the description, or may be learned by practice of the presented embodiments of the disclosure.

According to one or more embodiments, a method of reducing and killing bacteria and fungi, the method including:

bringing a composition including a *Ligularia fischeri* extract or a fraction thereof as an active ingredient into contact with cells or tissues of a subject; and irradiating cells or tissues of a subject in contact with the composition with an absorbable wavelength of excitation light.

The absorbable wavelength of excitation light may be light having a wavelength of 200 nm to 800 nm, and The excitation light may be irradiated at an intensity of 1 $W/m^2$ or more for 1 minute or more.

The light may include a light source of a LED lamp, a halogen lamp, an incandescent lamp, a fluorescent lamp, a sodium lamp, a mercury lamp, a metal-halide lamp, laser, natural light, or combinations thereof.

The LED lamp may emit light originating from an LED mask.

The *Ligularia fischeri* extract or a fraction thereof may exhibit activity in red light having the wavelength of 630 nm and 690 nm.

The *Ligularia fischeri* extract may be extracted and filtered by adding, to dry, pulverized *Ligularia fischeri*, an alcoholic solvent, an aqueous solvent, an organic solvent, or a solvent mixture thereof in an amount 5 to 10 times the dry, pulverized *Ligularia fischeri* to form a mixture and refluxing the mixture at room temperature for 1 to 10 hours.

The *Ligularia fischeri* fraction may be the n-hexane fraction, methylene chloride fraction, ethyl acetate fraction, an acetone fraction, methanol fraction, ethanol fraction, water fraction, or solvent mixture thereof of the *Ligularia fischeri* extract.

The composition may further include one or more carriers or additives selected from: lactose, corn, starch, soybean oil, microcrystalline cellulose, mannitol, magnesium stearate, talc, polyvinylpyrrolidone, hydroxypropylcellulose, carboxymethylcellulose calcium, sodium starch glycolate, polacrilin potassium, crospovidone, white sugar, fructose, sorbitol, or aspartame; sodium carboxymethylcellulose, beta-cyclodextrin, white lead, and xanthan gum, which are stabilizers; and methyl paraoxybenzoate, propyl paraoxybenzoate, and potassium sorbate, which are preservatives.

The bacteria may be selected from *Staphylococcus aureus*, methicillin-resistant *Staphylococcus aureus* (MRSA), *Staphylococcus epidermidis, Streptococcus pneumoniae, Streptococcus mutans, Streptococcus pyogenes, Enterococcus faecalis, Enterococcus faecium, Propionibacterium acnes, Cutibacterium acnes, Bacillus subtilis, Clostridioides difficile, Clostridium innocuum, Lactobacillus, Bifidobacterium, Eggerthella, Escherichia coli, Pseudomonas aeruginosa, Neisseria gonorrhoeae, Chlamydia trachomatis, Yersinia pestis, Klebsiella pneumoniae, Legionella pneumophila, Proteus mirabilis, Enterobacter cloacae, Serratia marcescens, Helicobacter pylori, Salmonella enteritidis, Salmonella typhimurium, Acinetobacter baumannii, Vibrio cholera, Porphyromonas gingivalis, Prevotella intermedia, Tannerella forsythia, Treponema denticola, Fusobacterium nucleatum, Aggregatibacter actinomycetemcomitans,* and *Aeromonas hydrophila*.

The fungi may be selected from *Candida* species, *Candida albicans*, *Aspergillus fumigatus*, *Aspergillus flavus*, *Cryptococcus neoformans*, *Histoplasma capsulatum*, *Pneumocystis jirovecii*, *Stachybotrys chartarum*, *Trichophyton rubrum*, *Trichophyton mentagrophytes*, *Epidermophyton floccosum*, *Microsporum gypseum*, *Trichophyton*, *Microsporum*, and *Epidermophyton*.

According to another aspect, provided is a photodynamic treatment method using the method described above.

The method may be used to treat dermatoses, acne, pneumonia, sinusitis, urethritis, prostatitis, sepsis, bacteremia, burn infections, wound infections, otitis externa, otitis media, folliculitis, keratitis, atopic dermatitis, endophthalmitis, neopharitis, meningitis, brain tumors, endothelia, endocarditis, vaginitis, dental cariesis, periodontitis, periodontal disease, colitis, enterobacterial infections, or oral bacterial infections.

According to another aspect, there is provided a sterilization method including:

bringing a composition including a *Ligularia fischeri* or a fraction thereof as an active ingredient into contact with a food, a fruit, a meat, a fresh meat, water, a nutrient solution, a plant, a crop, a container, a packaging material, or an appliance;

irradiating the food, fruit, meat, fresh meat, water, nutrient solution, plant, crop, container, packaging material, or appliance which is in contact with the composition with an absorbable wavelength of excitation light; and reducing and killing bacteria and fungi on the food, fruit, meat, fresh meat, water, nutrient solution, plant, crop, container, packaging material, or appliance which has been irradiated by the excitation light.

The absorbable wavelength of excitation light is light having a wavelength of 200 nm to 800 nm, and The excitation light may be irradiated at an intensity of 1 $W/m^2$ or more for 1 minute or more.

The excitation light may include a light source of a LED lamp, a halogen lamp, an incandescent lamp, a fluorescent lamp, a sodium lamp, a mercury lamp, a metal-halide lamp, laser, natural light, or combinations thereof.

The *Ligularia fischeri* extract or the fraction thereof may exhibit activity in red light of a wavelength between 630 nm and 690 nm.

The *Ligularia fischeri* extract may be extracted and filtered by adding, to dry, pulverized *Ligularia fischeri*, an alcohol solvent, an aqueous solvent, an organic solvent, or a solvent mixture thereof in an amount 5 to 10 times the dry, pulverized *Ligularia fischeri* and refluxing the mixture at room temperature for 1 to 10 hours.

The method may be used to sterilize cosmetic containers, food packaging materials, food storage containers, foods, fruits, meats, fresh meat, water, vegetable cultures, horticultural nutrient solutions, plants, crops, toilet equipment, toiletry equipment, sanitary equipment, toothbrushes, combs, scissors, swabs, razors, earplugs, needles, needles for acupuncture, nail clippers, forceps, or kitchen equipment.

BRIEF DESCRIPTION OF THE DRAWINGS

The above and other aspects, features, and advantages of certain embodiments of the disclosure will be more apparent from the following description taken in conjunction with the accompanying drawings, in which.

Figure 10:
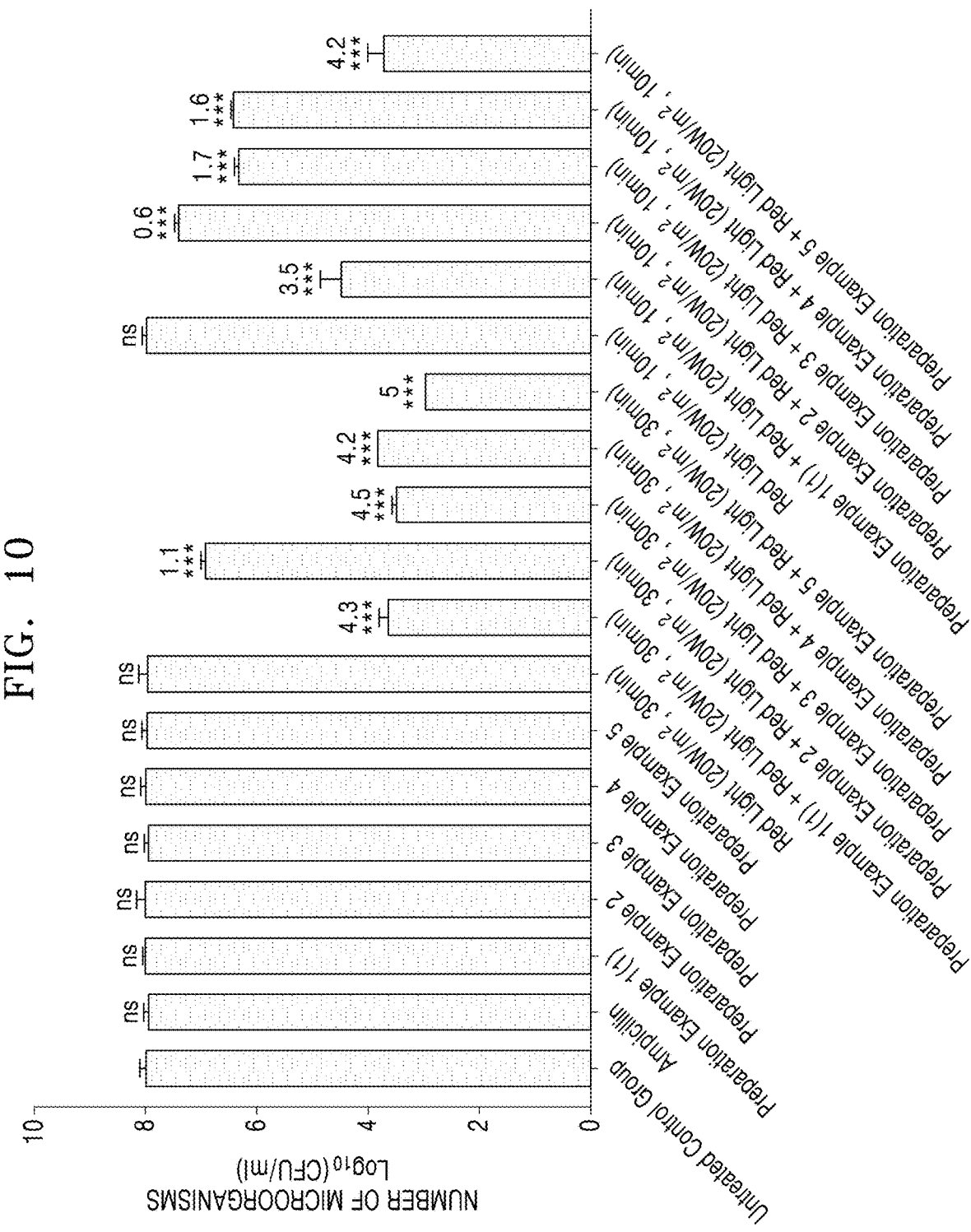
Figure 11A:
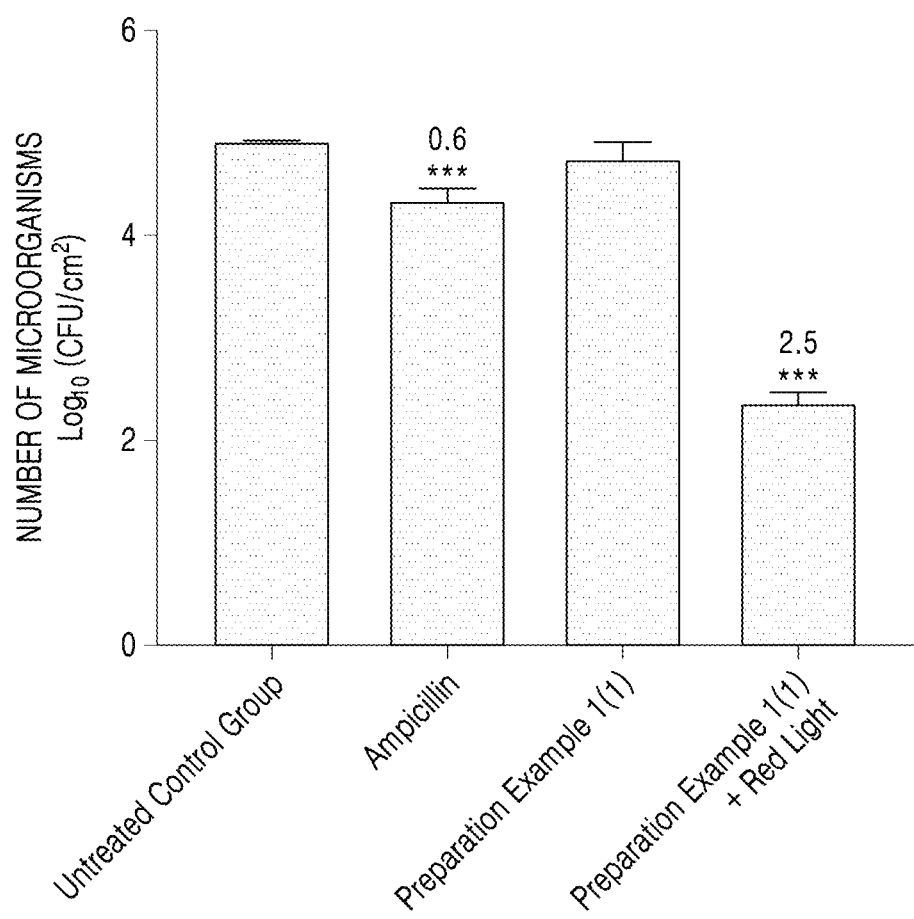
Figure 11B:
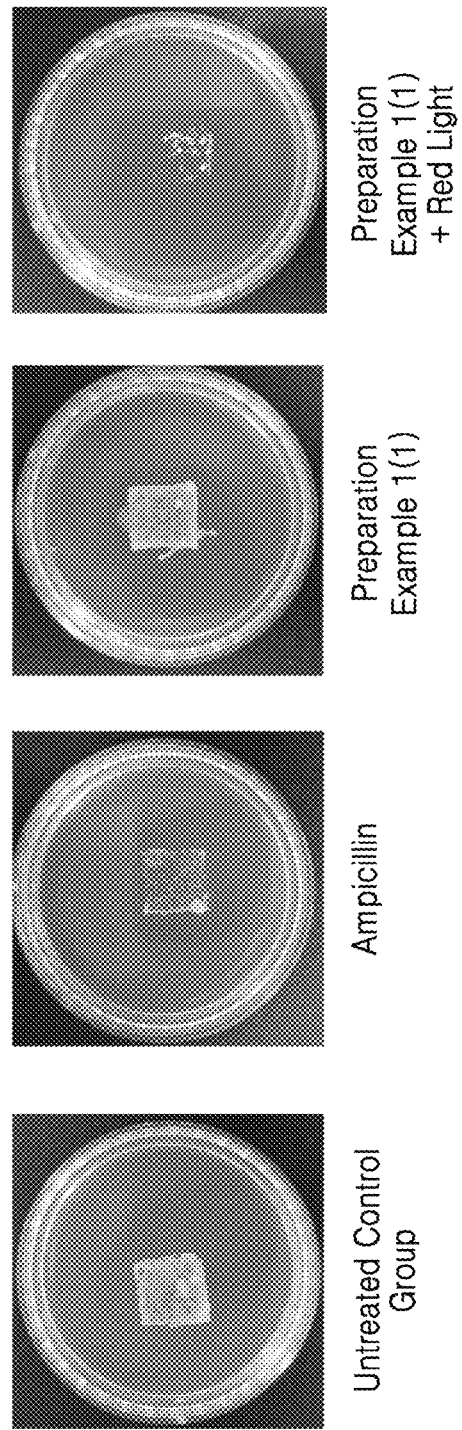

FIG. 10 shows the results obtained by measuring, with respect to *Cutibacterium acnes* KCTC3314, the antibacterial/sterilization activity of an untreated control group, a group treated with red light alone, groups treated with *Ligularia fischeri* fractions according to Preparation Examples 2 to 5 alone, and groups treated with *Ligularia fischeri* fractions according to Preparation Examples 2 to 5 treated with red light, under the condition of irradiation with light of low luminous intensity (20 W/m$^2$) for 10 minutes or 30 minutes;

FIG. 11A shows CFU measurement results of the number of acne bacteria of an untreated control group, a group treated with Ampicillin alone, a group treated with a *Ligularia fischeri* ethanol extract according to Preparation Example 1(1) alone, and a group treated with a *Ligularia fischeri* ethanol extract according to Preparation Example 1(1) treated with red light, on miniature pig skin, to confirm the photodynamic antibacterial/sterilization therapeutic effect on pig skin;

FIG. 11B are images showing antibacterial/sterilization therapeutic effects obtained using a stamping method, with respect to an untreated control group, a group treated with Ampicillin alone, a group treated with a *Ligularia fischeri* ethanol extract according to Preparation Example 1(1) alone, and a group treated with a *Ligularia fischeri* ethanol extract according to Preparation Example 1(1) treated with red light on miniature pig skin to confirm the photodynamic antibacterial/sterilization therapeutic effect on pig skin;

FIG. 12A are images of a wound obtained by photographing a wound site on Days 0, 2, 4, 6, and 8 before the wound is infected with *Staphylococcus aureus*, to confirm the wound healing effect on a 7-week-old male BALB/c mouse, with respect to Control (PBS), a group treated with a *Ligularia fischeri* ethanol extract according to Preparation Example 1(1), a group treated with a *Ligularia fischeri* ethanol extract according to Preparation Example 1(1) and red light, and an ampicillin-treated group;

FIG. 12B are images of a wound obtained by photographing a wound site on Days 0, 2, 4, 6, and 8 after the wound is infected with *Staphylococcus aureus*, with respect to a S.A. bacteria-treated group, a group treated with a *Ligularia fischeri* ethanol extract according to Preparation Example 1(1), a group treated with red light, a group treated with a *Ligularia fischeri* ethanol extract according to Preparation Example 1(1) and red light, and an ampicillin-treated group.

Figure 13:
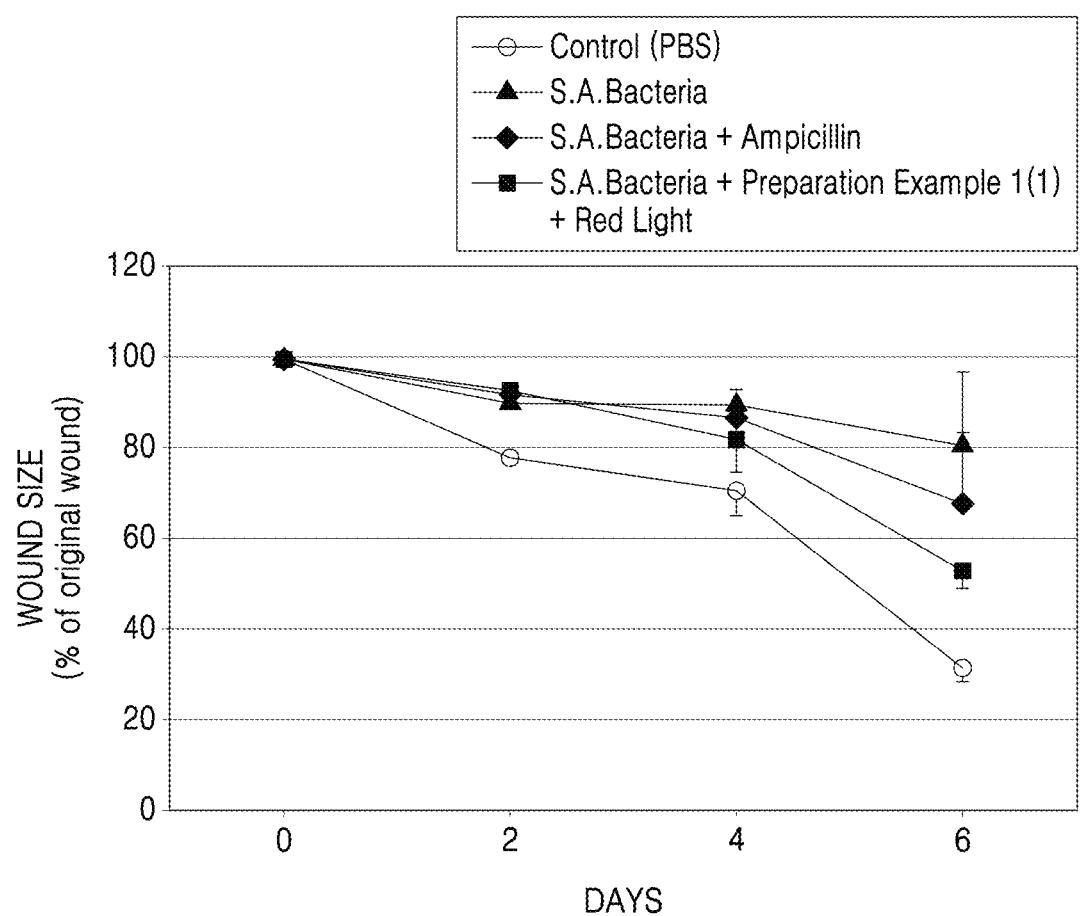
Figure 14:
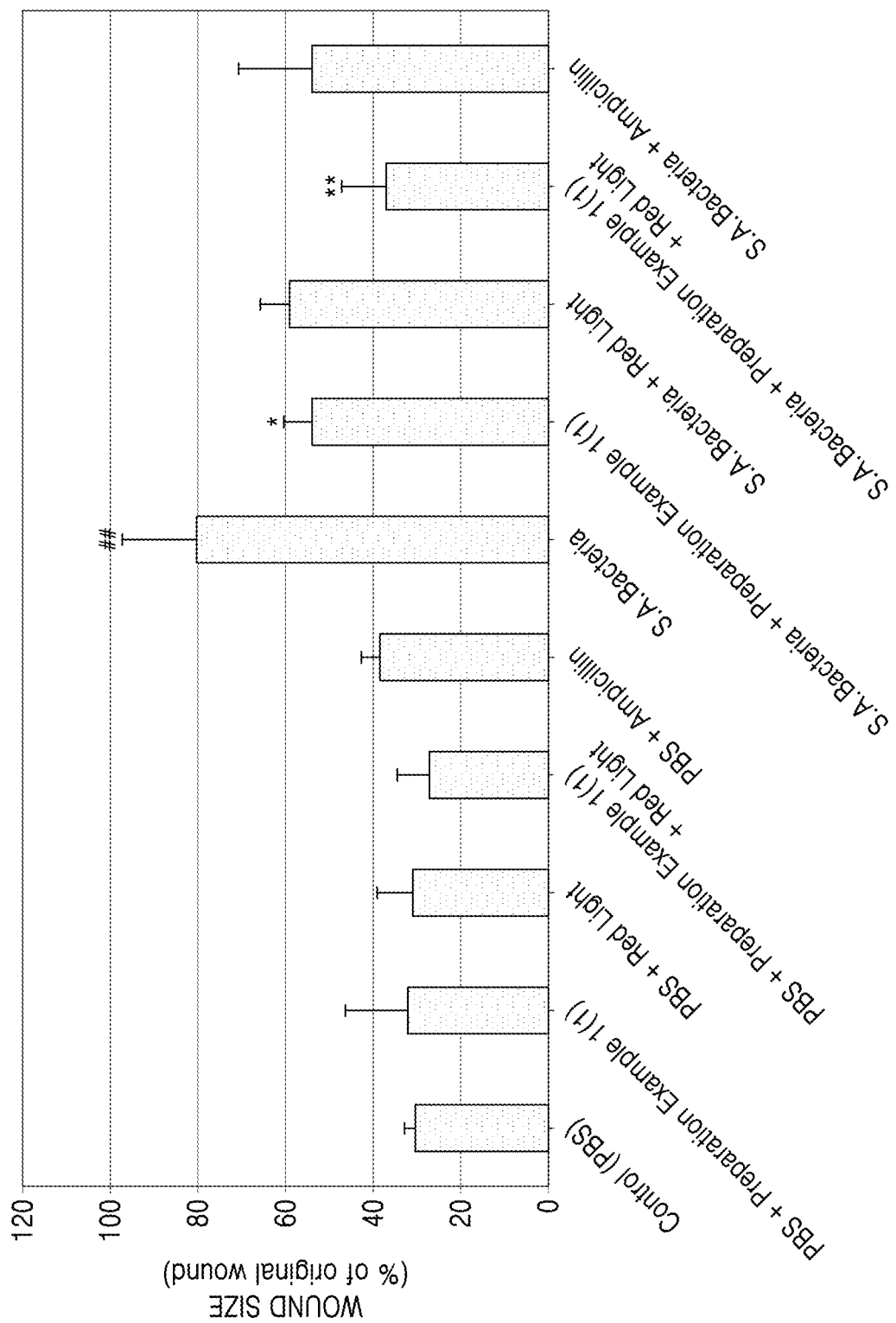
Figure 15A:
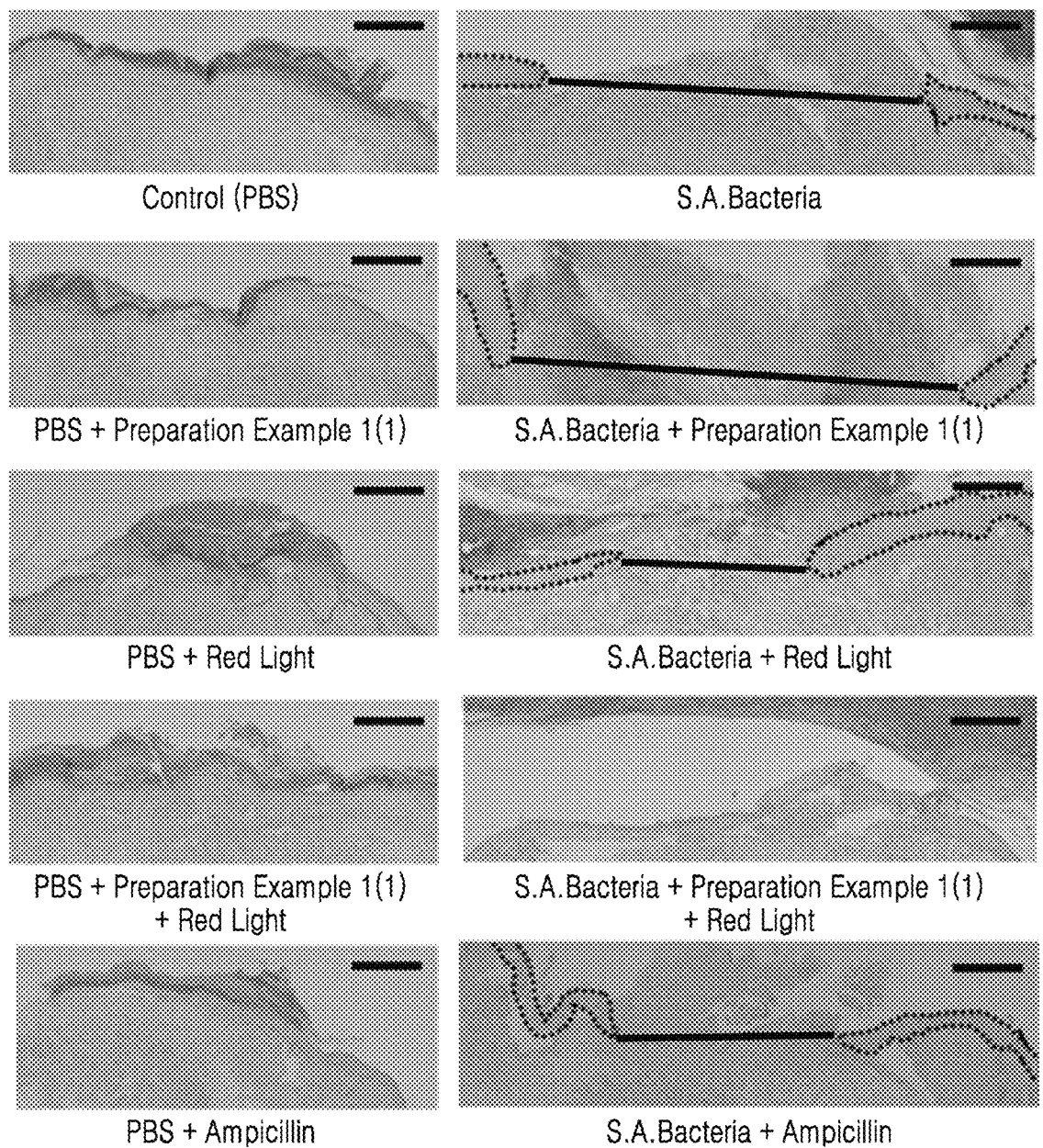
Figure 15B:
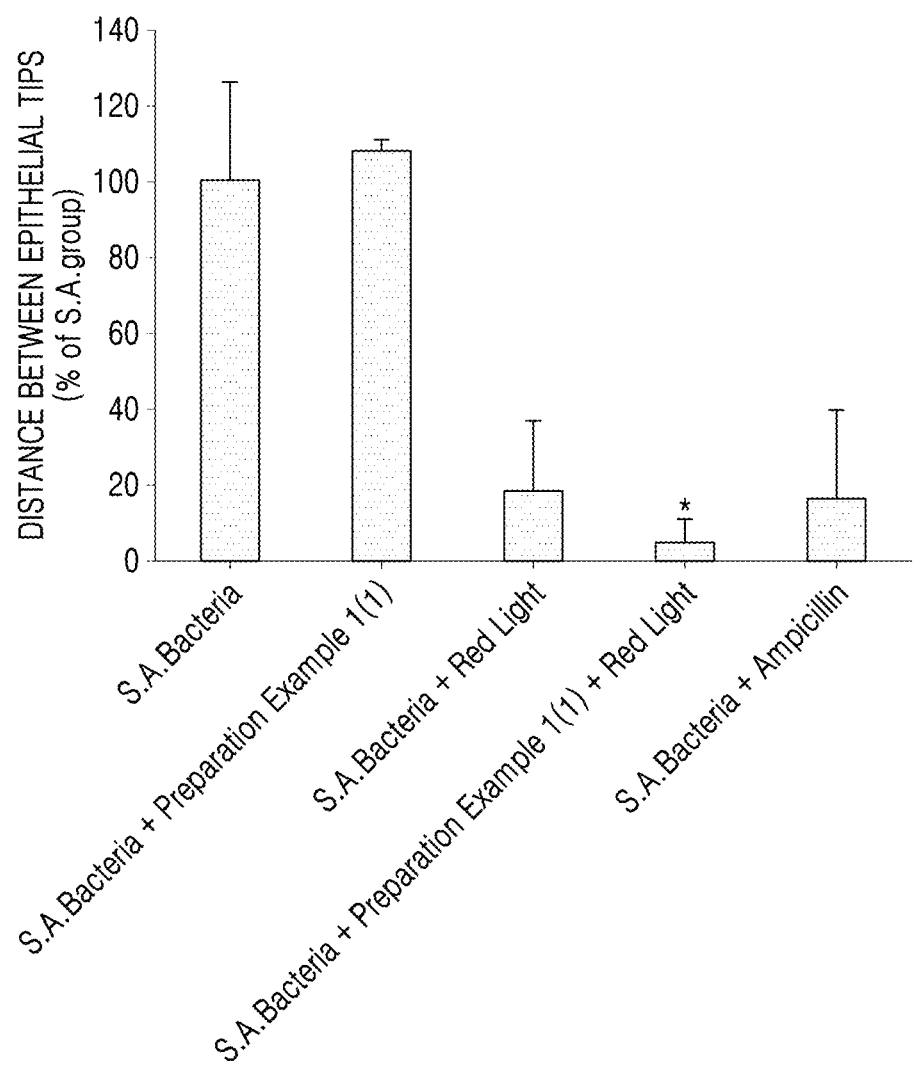

FIG. 13 shows the change in the wound size of a control (PBS)-treated group, an S.A. bacteria-treated group, a group treated with a *Ligularia fischeri* ethanol extract according to Preparation Example 1(1) and red light (S.A. bacteria+Preparation Example 1(1)+red light), and an ampicillin-treated group (S.A. bacteria—Ampicillin), on Days 0, 2, 4, and 6;

FIG. 14 shows the changes in wound size of a control (PBS)-treated group, a group treated with a *Ligularia fischeri* ethanol extract according to Preparation Example 1(1) (PBS+Preparation Example 1(1)), a group treated with red light (PBS+red light), a group treated with a *Ligularia fischeri* ethanol extract according to Preparation Example 1(1) and red light (PBS+Preparation Example 1(1)+red light), and an ampicillin-treated group (PBS+Ampicillin) on Day 8 before the wound is infected with *Staphylococcus aureus* (S.A. bacteria), and the changes in the wound size of the S.A. bacteria-treated group, the group treated with a *Ligularia fischeri* ethanol extract according to Preparation Example 1(1) (S.A. bacteria+Preparation Example 1(1)), the group treated with red light (S.A. bacteria+red light), the group treated with a *Ligularia fischeri* ethanol extract according to Preparation Example 1(1) and red light (S.A. bacteria+Preparation Example 1(1)+red light), and the ampicillin-treated group (S.A. bacteria+Ampicillin) on Day 8 after the wound is infected with *Staphylococcus aureus* (S.A. bacteria);

FIG. 15A shows microscope images of a wound tissue paraffin block obtained from a mouse treated with hematoxylin and eosin (H&E) staining, with respect to a control (PBS)-treated group, an S.A. bacteria-treated group, a group treated with PBS+Preparation Example 1(1), a group treated with S.A. bacteria+Preparation Example 1(1), a group treated with PBS+red light, a group treated with S.A. bacteria+red light, a group treated with PBS+Preparation Example 1(1)+red light, a group treated with S.A. bacteria+Preparation Example 1(1)+red light, a group treated with PBS+ampicillin, and a group treated with S.A. bacteria+ampicillin, on Day 8 of a wound experiment; and FIG. 15B shows wound closure measurements of an S.A. bacteria-treated group, a group treated with S.A. bacteria 30 Preparation Example 1(1), a group treated with S.A. bacteria+red light, a group treated with S.A. bacteria+Preparation Example 1(1)+red light, and a group treated with S.A. bacteria+ampicillin, on Day 8 of a wound experiment.

DETAILED DESCRIPTION

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the subject elements of the list.

A method of reducing and killing bacteria and fungi according to an embodiment of the present disclosure, and a photodynamic treatment method and a sterilization method using the method will now be described in detail with reference to the accompanying drawings. The following is presented as an example and does not limit the disclosure, which is defined only by the scope of the claims which follow.

The term "comprising" is used herein to indicate that other elements may be added and/or interposed, rather than excluding other elements, unless specifically stated otherwise.

The term "combination thereof" as used herein refers to a mixture or combination with one or more of the described components.

The term "subject" as used herein refers to an organism and is a concept including a human or an animal.

As used herein, *Ligularia fischeri* is a commonly ingested herb, and the *Ligularia fischeri* ethanol extract used in the present disclosure is an edible and safe extract. The scientific name of *Ligularia fischeri* is *Ligularia fischeri* (Ledeb.) Turcz.

A method of reducing and killing bacteria and fungi according to an embodiment may include: bringing a composition including a *Ligularia fischeri* extract or a fraction thereof as an active ingredient into contact with cells or tissues of a subject; and irradiating the cells or tissues of the subject in contact with the composition with an absorbable wavelength of excitation light.

First, a composition containing a *Ligularia fischeri* extract or a fraction thereof as an active ingredient is brought into contact with the cells or tissues of a subject.

The composition may include the *Ligularia fischeri* extract or a fraction thereof as an active ingredient. The composition may be brought into contact with the cells or tissues of a subject. The 'bring into contact' process may include applying the composition on the skin in the form of an ointment or cream or spray or mask pack, or injection or oral administration into the body in the form of a pharmaceutical composition. Then, time is allowed for the composition to be absorbed into the cells or tissues of the subject. The term "time for the composition to be absorbed into the cells or tissues of the subject" used herein refers to the time during which the composition is sufficiently capable of inducing reactive oxygen species (ROS) upon irradiation with excitation light. The *Ligularia fischeri* extract or a fraction thereof is used as a photosensitizer. The *Ligularia fischeri* extract or a fraction thereof may be activated from a ground state (singlet state) to an excited state (triplet state) by absorbing light of the wavelength. Thereafter, the *Ligularia fischeri* extract or a fraction thereof may be transitioned to the ground state thereof in three ways, via non-radioactive decay, photon emission, and/or energy transfer. The conversion of energy generates ROS. At this time, there may be two types of photodynamic reactions depending on the type of ROS. That is, there are a Type I photodynamic reaction in which free radicals are generated by reacting directly with a cell membrane or molecule to withdraw electrons to form superoxide anion radicals ($P_2$—) or by transferring electrons or hydrogen atoms to generate hydroxyl radicals (OH*) and/or peroxide radicals (OOH*), and a Type II photodynamic reaction in which singlet oxygen ($^1O_2$) is generated by transferring energy directly to a substrate. The compound represented by Formula 1 is associated with both Type I photodynamic reaction and Type II photodynamic reaction. The time for the absorption into the cells or tissues of a subject may be appropriately adjusted according to the amount of the composition in contact with the cells or tissues of a subject.

Next, the cells or tissues of the subject in contact with the composition are irradiated with an absorbable wavelength of excitation light. The absorbable wavelength of excitation light may be light having a wavelength of 200 nm to 800 nm. For example, the absorbable wavelength of excitation light may be light having a wavelength from 450 nm to 800 nm, or may be red light having a wavelength from 630 nm to 690 nm. The light may include a light source of a LED lamp, a halogen lamp, an incandescent lamp, a fluorescent lamp, a sodium lamp, a mercury lamp, a metal-halide lamp, laser, natural light, or combinations thereof. For example, the light may be originated from, for example, an LED mask, an LED tanning device, a light irradiation apparatus for skin, a medical light irradiation apparatus, a topical irradiation apparatus, or a medical laser apparatus. For example, the LED lamp may be light originating from an LED mask.

The excitation light may be irradiated at an intensity of 1 $W/m^2$ or more for 1 minute or more. For example, the excitation light may be irradiated at an intensity of 1 $W/m^2$ or more for 10 minutes or more, or 20 minutes or more, or 30 minutes or more. For example, the excitation light may be irradiated for 10 minutes or more at an intensity of 100 $W/m^2$ or more, or 15 minutes or more at an intensity of 120 $W/m^2$ or more, or 1 hour or more at an intensity of 600 $W/m^2$ or more to sufficiently induce ROS, to reduce and kill bacteria and fungi.

The *Ligularia fischeri* extract or a fraction thereof may exhibit an activity in the red light wavelength between 630 nm and 690 nm. For example, the *Ligularia fischeri* extract or a fraction thereof may exhibit a maximum activity in red light having the wavelength of 660 nm.

The *Ligularia fischeri* extract may include a pulverized product of the plant itself, a dry pulverized product thereof; or an extract of an alcohol solvent, an extract of an aqueous solvent, an extract of an organic solvent, or an extract of a solvent mixture including two or more of the alcohol solvent, the aqueous solvent, and the organic solvent, each of *Ligularia fischeri*. For example, the *Ligularia fischeri* extract may be an extract of a C1-C5 alcohol solvent, an extract of an aqueous solvent, or an extract of a solvent mixture of these. For example, the *Ligularia fischeri* extract may be an ethanol solvent extract of the *Ligularia fischeri*. To obtain the *Ligularia fischeri* extract, heat extraction, freeze extraction, reflux extraction, ultrasonic extraction, or the like may be used. This extraction may be carried out at room temperature or under heating. In an embodiment, the *Ligularia fischeri* extract may be extracted and filtered by adding, to dry, pulverized *Ligularia fischeri*, an alcohol solvent, an aqueous solvent, an organic solvent, or a solvent mixture thereof in an amount 5 to 10 times the dry, pulverized *Ligularia fischeri* and refluxing the mixture at room temperature for 1 to 10 hours. For example, the *Ligularia fischeri* extract may be obtained by adding, to the dry pulverized *Ligularia fischeri* extract, the alcohol solvent, the water solvent, the organic solvent, or a solvent mixture thereof in an amount 5 to 10 times the dry pulverized *Ligularia fischeri* extract, and subjecting the mixture to reflux extraction at room temperature for 2 hours or more or ultrasonic extraction for 1 hour or more, and then filtering using paper filter paper. The extraction may be performed a plurality of times, for example two or more times, in order to increase the yield of the active ingredient.

The *Ligularia fischeri* extract may be used in the concentrate, and may be used in the form of a freeze-dried product after concentration and freeze-drying. In an embodiment, the *Ligularia fischeri* extract may be used in a concentrate so that the *Ligularia fischeri* extract is used at a sufficient concentration.

The *Ligularia fischeri* extract may be included as a soluble extract of a non-polar solvent obtained by further extracting using the non-polar organic solvent. The soluble extract of the non-polar solvent may be obtained in such a manner that the extract of a C1-C5 alcohol solvent is suspended with water and then brought into contact with a solvent or solvent mixture of n-hexane, methylene chloride, ethyl acetate, acetone, methanol, ethanol and stirred with silica or celite to evaporate a solvent therefrom, and then, developed into a reversed-phase silica resin packed in a column. In an embodiment, the *Ligularia fischeri* ethanol extract may be brought into contact with a solvent or solvent mixture of methanol, n-hexane, methylene chloride, acetone, methanol (or ethanol), stirred with silica or celite to evaporate the solvent, and then developed into a reversed-phase silica resin packed in a column. Thereafter, chromatography may be performed to elute acetone, methanol, ethanol, and water at an appropriate volume ratio to obtain a fraction of the *Ligularia fischeri* extract.

The *Ligularia fischeri* fraction may be obtained by suspending the *Ligularia fischeri* extract in water and then allowed to pass through a separatory funnel and a fraction thereof is obtained using the polarity of the solvent.

The *Ligularia fischeri* fraction may be the n-hexane fraction, methylene chloride fraction, ethyl acetate fraction, an acetone fraction, methanol fraction, ethanol fraction, water fraction, or solvent mixture thereof of the Ligularia fischeri extract.

The bringing the composition including the *Ligularia fischeri* extract or a fraction thereof as an active ingredient into contact with the cells or tissues of the subject may include administering, to the subject, the composition in the form of one formulation selected from a liquid, a suspension, a powder, a granule, a tablet, a capsule, a pill, an ointment, an injection, a cream, a gel, a patch, a concentrate, a spray, and a mask pack.

When formulated into the respective dosage forms, the composition may be prepared by the addition of pharmaceutically acceptable carriers or additives that are necessary for the preparation of the respective dosage forms. Typically, when formulated into a dosage form for oral administration, the carriers may include at least one of a diluent, a lubricant, a binder, a disintegrant, a sweetener, a stabilizer, and a preservative, and the additives may include at least one of a flavor, a vitamin, and an antioxidant.

The composition may further include one or more carriers or additives selected from: lactose, corn, starch, soybean oil, microcrystalline cellulose, mannitol, magnesium stearate, talc, polyvinylpyrrolidone, hydroxypropylcellulose, carboxymethylcellulose calcium, sodium starch glycolate, polacrilin potassium, crospovidone, white sugar, fructose, sorbitol, or aspartame; sodium carboxymethylcellulose, beta-cyclodextrin, white lead, and xanthan gum, which are stabilizers; and methyl paraoxybenzoate, propyl paraoxybenzoate, and potassium sorbate, which are preservatives.

The composition may further include, in addition to the components, any known additive to enhance taste, of which examples are: a natural flavor such as muzzle flavor, lemon flavor, pineapple flavor, and herb flavor; a natural pigment such as natural fruit juice, chlorophyllin, and flavonoid; a sweetening component such as fructose, honey, sugar alcohol, and sugar; or a sour agent such as citric acid and sodium citrate.

Examples of such bacteria may include Gram positive bacteria and/or Gram negative bacteria.

The bacteria may be selected from *Staphylococcus aureus, Methicillin-resistant Staphylococcus aureus* (MRSA), *Staphylococcus epidermidis, Streptococcus pneumoniae, Streptococcus mutans, Streptococcus pyogenes, Enterococcus faecalis, Enterococcus faecium, Propionibacterium acnes, Cutibacterium acnes, Bacillus subtilis, Clostridioides difficile, Clostridium innocuum, Lactobacillus, Bifidobacterium, Eggerthella, Escherichia coli, Pseudomonas aeruginosa, Neisseria gonorrhoeae, Chlamydia trachomatis, Yersinia pestis, Klebsiella pneumoniae, Legionella pneumophila, Proteus mirabilis, Enterobacter cloacae, Serratia marcescens, Helicobacter pylori, Salmonella enteritidis, Salmonella typhimurium, Acinetobacter baumannii, Vibrio cholera, Porphyromonas gingivalis, Prevotella intermedia, Tannerella forsythia, Treponema denticola, Fusobacterium nucleatum, Aggregatibacter actinomycetemcomitans,* and *Aeromonas hydrophila.*

The fungus may be selected from *Candida* species, *Candida albicans, Aspergillus fumigatus, Aspergillus flavus, Cryptococcus neoformans, Histoplasma capsulatum, Pneumocystis jirovecii, Stachybotrys chartarum, Trichophyton rubrum, Trichophyton mentagrophytes, Epidermophyton floccosum, Microsporum gypseum, Trichophyton, Microsporum,* and *Epidermophyton.*

The method may also be effective in improving skin condition. For example, the skin condition may be improved by applying the composition including the *Ligularia fischeri* extract or a fraction thereof as an active ingredient directly on the skin, or applying the composition in the vicinity of a region to be irradiated with an LED light lamp emitted from an LED mask, an LED tanning device, or a medical local light irradiation apparatus, followed by irradiating the same with a LED light source.

To efficiently perform the process of application to the skin, in addition to the active ingredients, known compounding ingredients included in a functional additive and a cosmetic composition may be further included. Examples of the functional additive are water soluble vitamins, oil-soluble vitamins, polymer peptides, polymer polysaccharides, sphingolipids, and seaweed extracts. Examples of the known compounding ingredients include an oil-and-fat component, a moisturizer, an emollient, a surfactant, an organic pigment, an inorganic pigment, organic powder, an ultraviolet absorber, a preservative, a bactericide, an antioxidant, a plant extract, a pH adjuster, an alcohol, a pigment, a flavor, a blood circulation accelerator, a cooling sensation agent, an antiperspirant, purified water, and the like.

The composition for a photodynamic reaction to be applied to the skin is not particularly limited, but may be prepared into a formulation as desired. For example, the composition for a photodynamic reaction applied to the skin may be prepared in one or more formulation selected from powder, skin lotion, skin softener, skin toner, astringent, lotion, milk lotion, moisturizer lotion, nutrient lotion, massage cream, nutritional cream, moisturizing cream, hand cream, foundation, essence, nutritive essence, pack, shampoo, soap, cleansing foam, cleansing lotion, cleansing cream, body lotion, and body cleanser.

For example, when the formulation is a paste, cream, or gel, animal fiber, vegetable fiber, wax, paraffin, starch, tragacanth, cellulose derivative, polyethylene glycol, silicone, bentonite, silica, talc, or zinc oxide may be used as a carrier component.

For example, when the formulation is a powder or spray, lactose, talc, silica, aluminum hydroxide, calcium silicate, or polyamide powder may be used as the carrier component. For example, in the case of a spray, a propellant such as chlorofluorohydrocarbon, propane/butane or dimethyl ether may be used.

For example, when the formulation is a solution or an emulsion, a solvent, a solvating agent, or an emulsifying agent may be used as a carrier component. For example, water, ethanol, isopropanol, ethylcarbonate, ethylacetate, benzylalcohol, benzylbenzoate, propylene glycol, 1,3-butylglycol oil, glycerol aliphatic esters, polyethylene glycol, or fatty acid esters of sorbitan may be included.

For example, when the formulation is a suspension, a liquid diluent such as water, ethanol or propylene glycol; a suspending agent such as ethoxylated isostearyl alcohol; polyoxyethylene sorbitol ester and polyoxyethylene sorbitan ester; microcrystalline cellulose; aluminum metahydroxide; bentonite; agar; or tragacanth may be used as a carrier component.

For example, when the formulation is a surfactant-containing cleansing, an aliphatic alcohol sulfate, aliphatic alcohol ether sulfate, sulfosuccinic monoesters, isethionates, imidazolinium derivatives, methyltaurates, sarcosinates, fatty amide ether sulfates, alkylamidobetaines, aliphatic alcohols, fatty acid glycerides, fatty diethanolamides, vegetable oils, linolin derivatives, or ethoxylated glycerol fatty acid esters may be used as a carrier component.

For example, when the formulation is a soap, an alkali metal salt of fatty acid, a fatty acid hemiester salt, fatty acid protein hydrolysate, isethionate, lanolin derivative, aliphatic alcohol, vegetable oil, glycerol, sugar, or the like may be used as a carrier component.

A method according to another embodiment provides a photodynamic treatment method using the method described above.

The method may be used to treat dermatoses, acne, pneumonia, sinusitis, urethritis, prostatitis, sepsis, bacteremia, burn infections, wound infections, otitis externa, otitis media, folliculitis, keratitis, atopic dermatitis, endophthalmitis, neopharitis, meningitis, brain tumors, endothelia, endocarditis, vaginitis, dental cariesis, periodontitis, periodontal disease, colitis, enterobacterial infections, or oral bacterial infections.

The method may be used to treat oral diseases and periodontal diseases. For example, the method may be used to treat caries, tartar, dental caries, periodontitis, periodontal disease, or tooth loss. For example, in the method, with respect to Streptococcus mutans bacteria, which is gram positive, facultative anaerobe (or microaerophilic) bacteria, and which is commonly known as caries bacteria, the composition including the *Ligularia fischeri* extract or a fraction thereof as an active ingredient is brought into contact with the cells or tissues of a subject and then treated with red light. In this case, the growth of Streptococcus mutans is effectively inhibited. Accordingly, various oral diseases, such as a plaque formation, dental caries, periodontitis, periodontal disease, tooth loss, and bacterial endocarditis, can treat a variety of oral diseases such as tartar formation, tooth caries, and the like may be treated. For example, the *Aggregatibacter actinomycetemcomitans* bacteria, which is a gram negative, facultative anaerobic, or microaerophilic bacterium growing in the oral cavity, may cause various oral periodontal diseases such as periodontitis and periodontal disease. However, in the method, regarding the *Aggregatibacter actinomycetemcomitans* bacteria, when the composition including *Ligularia fischeri* extract or a fraction thereof as an active ingredient is brought into contact with the cells or tissues of a subject, followed by treatment with red light, the growth of *Aggregatibacter actinomycetemcomitans*, which is an oral harmful bacterium, can be effectively inhibited, and thus, plaque formation, dental caries, periodonstitis, periodontal disease and tooth loss may be treated. Bacterial vaginitis, endocarditis, enteritis, and enteropathy may also be treated.

The method may be used to treat skin diseases, acne, burn infections, wound infections, atopic dermatitis, or intraocular inflammation.

For example, *Cutibacterium acnes* (or *Propionibacterum acnes*) bacteria called acne bacteria are gram-positive bacteria, are bacteria growing under anaerobic conditions, are resistant even under aerobic conditions, and are known to play a key role in the induction of acne and dermatitis. While control of acne bacteria is essential for the treatment of acne, when the antibiotics are used for the therapy of acne, the antibiotic resistance of the acne bacteria may occur. Accordingly, the techniques for antibacterial/sterilization of such acne bacteria are essential for acne treatment. In addition, it is known that Cutibacterium acnes bacteria cause ocular inflammatory diseases such as blepharitis, which is a chronic inflammatory disease of the skin and the eyelashes of the eyelid, and endophthalmitis which is an intraocular inflammatory disease, and skin inflammatory diseases or skin immunodeficiency type. With respect to the acne bacteria, when the composition including the *Ligularia fischeri* or a fraction thereof as an active ingredient is brought into contact with the cells or tissues of a subject, followed by treatment with red light, acne bacteria may be more effectively controlled.

A sterilization method according to another embodiment includes: bringing a composition including a *Ligularia fischeri* or a fraction thereof as an active ingredient into contact with a food, a fruit, a meat, a fresh meat, water, a nutrient solution, a plant, a crop, a container, a packaging material, or an appliance; irradiating the food, fruit, meat, fresh meat, water, nutrient solution, plant, crop, container, packaging material, or appliance which is in contact with the composition with an absorbable wavelength of excitation light; and reducing and killing bacteria and fungi on the food, fruit, meat, fresh meat, water, nutrient solution, plant, crop, container, packaging material, or appliance which has been irradiated by the excitation light.

First, the composition is applied to a food, a fruit, a meat, a fresh meat, water, a nutrient solution, a plant, a crop, a container, a packaging material, or an appliance. The terms 'container, package, or appliance' may include kitchen utensil and kitchen utensil, including a cosmetic container, a food package, a food container, or a cosmetic product. The wording 'applying' may include roller applying, blade applying, brush applying, dipping applying, spray applying, or smoking applying, but is not limited thereto, and any application method that can be used in the art may be used. Then, the food, fruit, meat, fresh meat, water, nutrient solution, container, plant, agricultural product, packaging material, or appliance to which the photodynamic reaction composition has been applied, may be placed in a reactor. The food, fruit, meat, fresh meat, water, nutrient solution, container, plant, agricultural product, packaging material, or appliance to which the photodynamic reaction composition has been applied may be placed directly in the reactor, or may be placed on a support in a reactor. The support may be a material selected from glass materials, metal materials, plastic materials, or combinations thereof, and is not limited thereto, and any support available in the art may be used therefor.

Then, the food, fruit, meat, fresh meat, water, nutrient solution, plant, crop, container, packaging material, or appliance, each of which is in contact with the composition is irradiated with an absorbable wavelength of excitation light. The 'excitation light of an absorbable wavelength' may be light having the wavelength of 450 nm to 800 nm and may be red light, for example, LED light.

Then, ROS is generated with respect to the food, fruit, meat, fresh meat, water, nutrient solution, plant, crop, container, packaging material, or appliance which has been irradiated by the excitation light, to reduce and kill bacteria and fungi.

The absorbable wavelength of excitation light may be light having a wavelength of 200 nm to 800 nm. For example, the absorbable wavelength of excitation light may be light having the wavelength from 450 nm to 800 nm, or may be red light having the wavelength from 630 nm to 690 nm. The light may include a light source of a LED lamp, a halogen lamp, an incandescent lamp, a fluorescent lamp, a sodium lamp, a mercury lamp, a metal-halide lamp, laser, natural light, or combinations thereof. For example, the light may be originated from, for example, an LED mask, an LED tanning device, a light irradiation apparatus for skin, a medical light irradiation apparatus, a topical irradiation apparatus, or a medical laser apparatus. For example, the LED lamp may be light originating from an LED mask.

The excitation light may be irradiated at an intensity of 1 W/m² or more for 1 minute or more. For example, the excitation light may be irradiated at an intensity of 1 W/m² or more for 10 minutes or more, or 20 minutes or more, or 30 minutes or more. For example, the excitation light may be irradiated for 10 minutes or more at an intensity of 100 W/m² or more, or 15 minutes or more at an intensity of 120 W/m² or more, or 1 hour or more at an intensity of 600 W/m² or more to sufficiently induce ROS, to reduce and kill bacteria and fungi.

The *Ligularia fischeri* extract or a fraction thereof may exhibit activity in the red light wavelength between 630 nm and 690 nm. For example, the *Ligularia fischeri* extract or a fraction thereof may exhibit a maximum activity in the red light wavelength of 660 nm.

The composition and production method of the *Ligularia fischeri* and the fraction thereof are the same as those described above, and therefore the description thereof will be omitted.

The method may be used to sterilize cosmetic containers, food packaging materials, food storage containers, foods, fruits, meats, fresh meat, water, vegetable cultures, horticultural nutrient solutions, plants, crops, toilet equipment, toiletry equipment, sanitary equipment, toothbrushes, combs, scissors, swabs, razors, earplugs, needles, needles for acupuncture, nail clippers, forceps, or kitchen equipment.

Examples of the present disclosure are described below. However, the following examples are only an example of the present disclosure, and the disclosure is not limited thereto.

EXAMPLES

Preparation Example 1: Preparation of *Ligularia fischeri* Extract (1) *Ligularia fischeri* Ethanol Extract The ground part (leaves, stems, flowers) of the *Ligularia fischeri* collected, on June 2016, from from Mt. Nochu, Gangneung-si, Gangwon-do, was dried and then pulverized to obtain a dry pulverized product of *Ligularia fischeri*. 100 g of the dry pulverized product of *Ligularia fischeri* was placed in an extraction vessel, and then 1 L of ethanol was added thereto, followed by reflux extraction for 2 hours, and the process of gravity filtration with paper filter paper was performed, wherein the cycle of extraction and filtering was performed twice (two times 'extraction-filtering') to obtain a filtered extract of mold ethanol. The filtered *Ligularia fischeri* ethanol extract was placed in a vacuum concentrator and the solvent was completely evaporated therefrom to obtain a concentrate to obtain 3.2 g of a *Ligularia fischeri* ethanol extract 1 (yield of 3.2%).

(2) *Ligularia fischeri* Aqueous Solvent Extract

*Ligularia fischeri* ethanol extract 1 was performed to obtain 4.3 g (yield 4.3%) of *Ligularia fischeri* aqueous solvent extract was obtained in the same manner as used in (1) to obtain *Ligularia fischeri* extract ethanol 1, except that 1 L of distilled water was used instead of 1 L of ethanol.

Preparation Example 2: Preparation of *Ligularia fischeri* Fraction 1

0.2 g of the *Ligularia fischeri* ethanol extract according to Preparation Example 1(1) was brought into contact with an ethanol solvent, stirred with Celite to evaporate the solvent therefrom, and developed into a Diaion HP-20 resin packed in a column. Chromatography was performed eluting an ethanol solvent and a water solvent at the the volume ratio of 3:2 to obtain *Ligularia fischeri* fraction 1.

Preparation Example 3: Preparation of *Ligularia fischeri* Fraction 2

*Ligularia fischeri* fraction 2 was prepared in the same manner as in Preparation Example 2, except that chromatography was performed eluting the ethanol solvent and a water solvent at a volume ratio of 4:1.

Preparation Example 4: Preparation of *Ligularia fischeri* Fraction 3

*Ligularia fischeri* fraction 2 was prepared in the same manner as in Preparation Example 2, except that chromatography was performed eluting the ethanol solvent and a water solvent of 1:0 at a volume ratio.

Preparation Example 5: Preparation of *Ligularia fischeri* Fraction 4

*Ligularia fischeri* fraction 4 was prepared in the same manner as in Preparation Example 2, except that *Ligularia fischeri* fraction 2 was obtained by performing chromatography eluting at a volume ratio of an ethanol solvent and an acetone solvent of 1:1.

Preparation Example 6: Preparation of *Ligularia fischeri* Fraction 5

0.2 g of the *Ligularia fischeri* ethanol extract according to Preparation Example 1(1) was brought into contact with a methanol solvent, stirred with silica or celite to evaporate the solvent therefrom, and developed into a reversed phase silica resin packed in a column. Then, chromatography was performed eluting the methanol solvent and a water solvent at a volume ratio of 1:4 to obtain *Ligularia fischeri* fraction 5.

Preparation Example 7: Preparation of *Ligularia fischeri* Fraction 6

*Ligularia fischeri* fraction 6 was prepared in the same manner as in Preparation Example 6, except that chromatography was performed eluting a methanol solvent and a water solvent of 2:3 at a volume ratio.

Preparation Example 8: Preparation of *Ligularia fischeri* Fraction 7

*Ligularia fischeri* fraction 7 was prepared in the same manner as in Preparation Example 6, except that chromatography was performed eluting a methanol solvent and a water solvent of 3:2 at a volume ratio.

Preparation Example 9: Preparation of *Ligularia fischeri* Fraction 8

*Ligularia fischeri* fraction 8 was prepared in the same manner as in Preparation Example 6, except that chromatography was performed eluting a methanol solvent and a water solvent of 4:1 at a volume ratio.

Preparation Example 10: Preparation of *Ligularia fischeri* Fraction 9

*Ligularia fischeri* fraction 9 was prepared in the same manner as in Preparation Example 6, except that chromatography was performed eluting a methanol solvent alone.

Unless otherwise specified, the compound samples and microorganisms used in the following Evaluation Examples were purchased or obtained from the following suppliers.

Compound Sample

Ampicillin, vancomycin, nystatin, gentamicin, and dimethyl sulfoxide were purchased from Sigma-Aldrich Inc. (USA). *Ligularia fischeri* ethanol extract was dissolved in dimethylsulfoxide and then used for microbial treatment.

Purchase of Microorganism

*Streptococcus mutans* KCTC 3065 and *Aggregatibacter actinomycetemcomitans* KCTC2581, which are oral harmful bacteria; acne bacteria (*Cutibacterium acnes*) KCTC3314; *Staphylococcus aureus* KCTC1916 and *Staphylococcus aureus* KCTC3881, which are Gram positive bacteria; *Pseudomonas aeruginosa* PAO1, which is a Gram-negative bacteria; and *Candida albicans* KCTC7965, which is a pathogenic fungus, were obtained from Korean Collection for Type Culture. For Methicillin-resistant *Staphylococcus aureus* (MRSA) 2659, the bacteria isolated from a specimen by using the method described in the document *J. Microbiol.* 2007, vol. 45, pp. 53-57, was used.

Statistical Analysis

The colony forming units (CFU), the number of microorganisms in each group, were indicated by the mean±standard deviation, the statistical analysis was performed using a one-way analysis of variance (ANOVA) and Dunnett's post-assay method, and analyzed using GraphPad Prism software (version 7.04, USA). It was judged to be statistically significant if $p<0.001$.

Evaluation Example 1: Measurement of Antibacterial/Sterilization Activity Against *Streptococcus mutans*

A culture prepared by inoculating *Streptococcus mutans* KCTC 3065 which is an oral harmful bacterium into a LB (Lura Bertani) medium was diluted so as to have an absorbance (OD 600 nm) of 0.01, and then 0.1% of dimethyl sulfoxide was administered thereto as a untreated control group, or 20 µg/mL of the *Ligularia fischeri* ethanol extract according to Preparation Example 1(1) and 100 µg/mL of ampicillin were each administered, and the culture was incubated at room temperature for 30 minutes using a stirrer. Then, 100 µL of each culture was transferred to a 96-well plate, and then 120±20 $W/m^2$ of LED red light (wavelength: 660 nm) was irradiated for 15 minutes. Each of the treated cultures was diluted, plated on LB medium, cultured at 37° C. for 24 hours, and then a colony forming unit (CFU) was measured to evaluate antibacterial/sterilization activity. The number of measured microorganisms was converted to a common logarithmic number (Log 10), and the difference in the numbers of microorganisms between groups was verified by a one-way analysis of variance and Dunnett's multiple comparison test. The statistical significance of the untreated control was expressed as ***$p<0.001$. When statistical significance was shown, the degree of decrease compared to the control was indicated by a common log number. The results are shown in FIG. 1.

Figure 1:
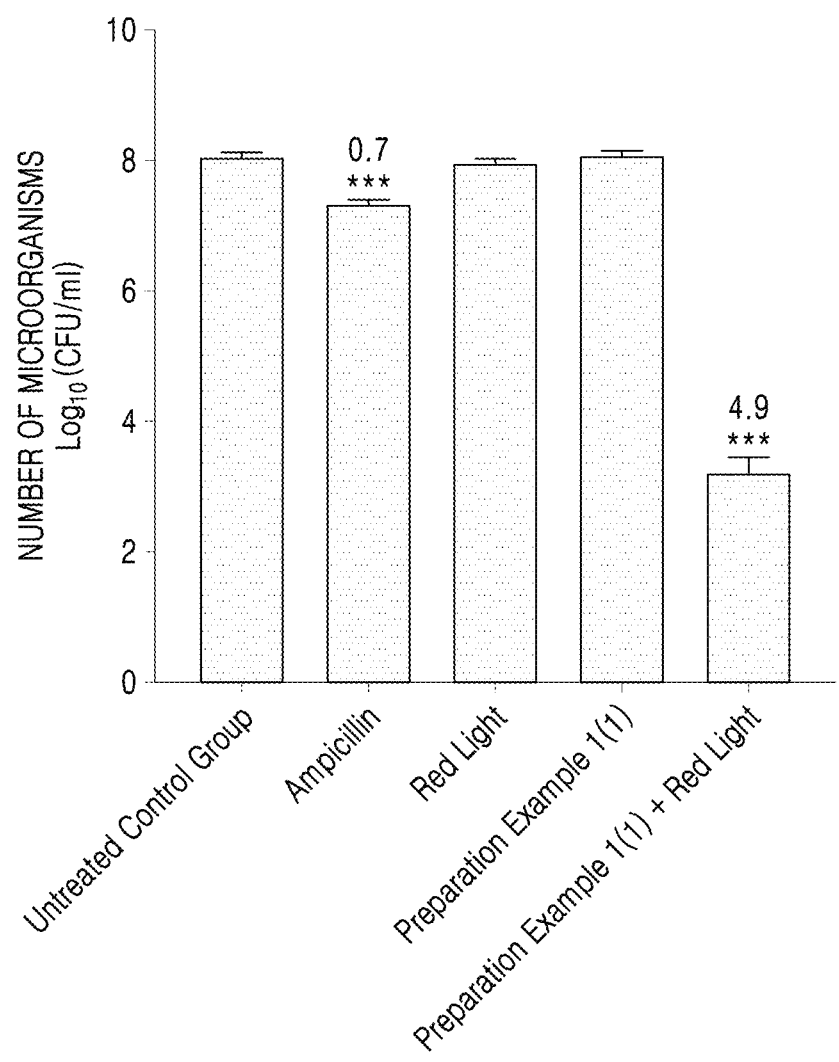
FIG. 1 shows the results obtained by measuring, with respect to *Streptococcus mutans* KCTC3065, the antibacterial/sterilization activity of an untreated control group, an ampicillin-treated group, a group treated with red light alone, a group treated with a *Ligularia fischeri* ethanol extract according to Preparation Example 1(1) alone, and a group treated with a *Ligularia fischeri* ethanol extract according to Preparation Example 1(1) treated with red light.

Referring to FIG. 1, it can be seen that, compared to the untreated control group, *Streptococcus mutans* KCTC 3065, when the *Ligularia fischeri* ethanol extract according to Preparation Example 1(1) was treated with red light, a distinct antibacterial/sterilizing ability was obtained. In comparison, when only red light was treated or only the *Ligularia fischeri* ethanol extract according to Preparation Example 1 (1) was treated, no antibacterial/sterilization ability was exhibited.

From this, it can be confirmed that the growth of *Streptococcus mutans*, which is an oral harmful bacterium, can be effectively suppressed when the *Ligularia fischeri* ethanol extract according to Preparation Example 1(1) was treated with red light.

Evaluation Example 2: Antimicrobial/Stericidal Activity Measurement Against *Aggregatibacter Actinomycesemcomitans*

*Aggregatibacter actinomycetemcomitans* KCTC2581, which is an oral harmful bacterium, was inoculated into brain heart infusion (BHI) broth medium and incubated at 37° C. for 24 hours under aerobic conditions. The obtained culture was diluted with BHI medium so as to have an absorbance (OD 600 nm) of 0.01, and then 0.1% dimethyl sulfoxide was administered thereto as a untreated control group, or 20 µg/mL of the *Ligularia fischeri* ethanol extract according to Preparation Example 1(1) was administered, and the culture was incubated at room temperature for 30 minutes using a stirrer. Then, 100 µL of each culture was transferred to a 96-well plate, and then 120±20 $W/m^2$ of LED red light (wavelength: 660 nm) was irradiated for 15 minutes. Each of the treated cultures was diluted, plated on BHI medium, incubated at 37° C. for 24 hours, and then a colony forming unit (CFU) was measured to evaluate an antibacterial/sterilizing activity. The number of measured microorganisms was converted to a common logarithmic number (Log 10), and the difference in the numbers of microorganisms between groups was verified by a one-way analysis of variance and Dunnett's multiple comparison test. The statistical significance of the untreated control was expressed as ***$p<0.001$. When statistical significance was shown, the degree of decrease compared to the control was indicated by a common log number. The results are shown in FIG. 2.

Figure 2:
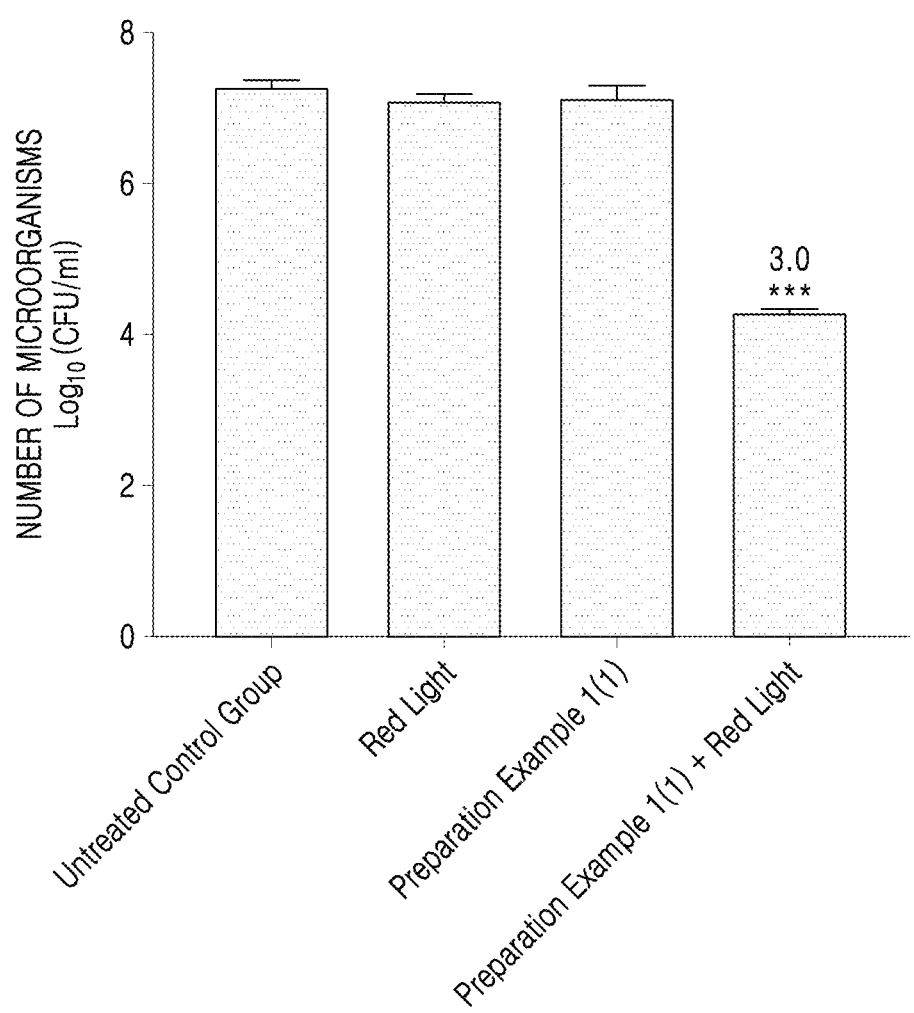
FIG. 2 shows the results obtained by measuring, with respect to *Aggregatibacter actinomycetemcomitans* KCTC2581, the antibacterial/sterilization activity of an untreated control group, a group treated with red light alone, a group treated with a *Ligularia fischeri* ethanol extract according to Preparation Example 1(1) alone, and a group treated with a Ligularia fischeri ethanol extract according to Preparation Example 1(1) treated with red light.

Referring to FIG. 2, compared to the untreated control *Aggregatibacter actinomycetemcomitans* KCTC2581, the case in which the *Ligularia fischeri* ethanol extract according to Preparation Example 1(1) was treated with red light, showed a distinguishable antibacterial/sterilizing ability. In comparison, no antibacterial/sterilizing ability was exhibited when only red light was treated or only the *Ligularia fischeri* ethanol extract according to Preparation Example 1(1) was treated alone.

From this, it was confirmed that the growth of the oral harmful bacteria *Aggregatibacter actinomycetemcomitans* can be effectively suppressed when the *Ligularia fischeri* ethanol extract according to Preparation Example 1(1) was treated with red light.

Evaluation Example 3: Measurement of Antibacterial/Sterilizing Activity Against Acne Bacteria (*Cutibacterium acnes*)

Acne bacteria (*Cutibacterium acnes* KCTC3314) were inoculated into BHI medium and incubated at 37° C. for about 2-3 days under anaerobic conditions. The obtained culture was diluted with BHI medium so as to have an absorbance (OD 600 nm) of 0.01, and then 0.1% dimethyl sulfoxide was administered thereto as a untreated control group, or 20 µg/mL of the Ligularia fischeri ethanol extract according to Preparation Example 1(1) was administered, and the culture was incubated at room temperature for 30 minutes using a stirrer. Then, 100 µL of each culture was transferred to a 96-well plate, and then 120±20 $W/m^2$ of LED red light (wavelength: 660 nm) was irradiated for 15 minutes. Each of the treated cultures was diluted, plated on BHI medium, incubated at 37° C. under anaerobic conditions, and then a colony forming unit (CFU) was measured to evaluate an antibacterial/sterilizing activity. The number of measured microorganisms was converted to a common logarithmic number (Log 10), and the difference in the numbers of microorganisms between groups was verified by a one-way analysis of variance and a Dunnett's post-verification method. The statistical significance of the untreated control was expressed as ***p<0.001. When statistical significance was shown, the degree of decrease compared to the control was indicated by a common log number. The results are shown in FIG. 3.

Figure 3:
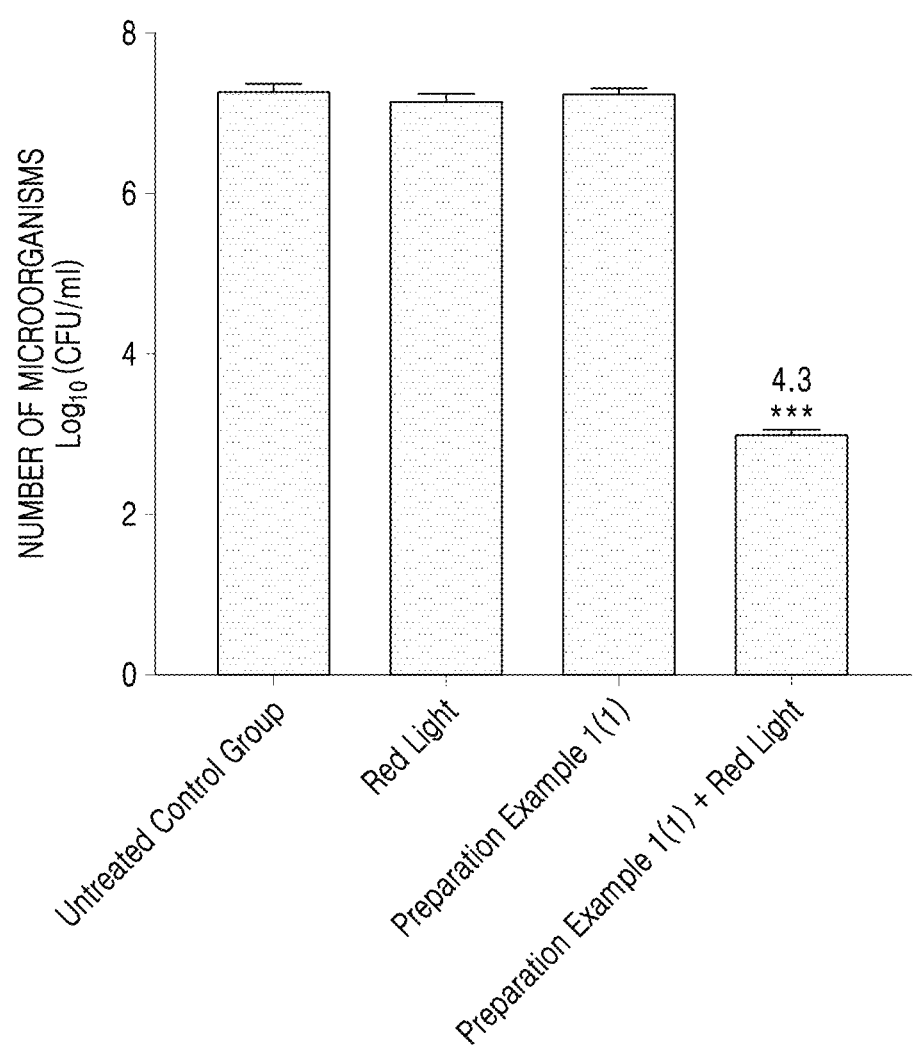
FIG. 3 shows the results obtained by measuring, with respect to an acne bacteria, *Cutibacterium acnes* KCTC3314, the antibacterial/sterilization activity of an untreated control group, a group treated with red light alone, a group treated with a *Ligularia fischeri* ethanol extract according to Preparation Example 1(1) alone, and a group treated with a *Ligularia fischeri* ethanol extract according to Preparation Example 1(1) treated with red light.

Referring to FIG. 3, compared to the untreated control acne bacteria *Cutibacterium acnes* KCTC3314, the case in which the Ligularia fischeri ethanol extract according to Preparation Example 1(1) was treated with red light, showed a distinguishable antibacterial/sterilizing ability. In comparison, no antibacterial/sterilizing ability was exhibited when only red light was treated or only the *Ligularia fischeri* ethanol extract according to Preparation Example 1(1) was treated alone.

From this, it can be confirmed that acne bacteria is effectively controlled when the *Ligularia fischeri* ethanol extract according to Preparation Example 1(1) was treated with red light.

Evaluation Example 4: Measurement of Antibacterial/Sterilization Activity Against *Staphylococcus aureus*

A culture prepared by inoculating *Staphylococcus aureus* KCTC1916, which is a gram-positive bacterium, into a LB medium was diluted using a LB medium so as to have an absorbance (OD 600 nm) of 0.01, and then 0.1% of dimethyl sulfoxide was administered thereto as a untreated control group, or 20 µg/mL of a Ligularia fischeri ethanol extract according to Preparation Example 1(1) and 100 µg/mL of ampicillin were each administered, and the cultures were incubated at room temperature for 30 minutes using a stirrer. Then, 100 µL of each culture was transferred to a 96-well plate, and then 120±20 W/m$^2$ of LED red light (wavelength: 660 nm) was irradiated for 10 minutes. Each of the treated cultures was diluted, plated on LB medium, incubated at 37° C., and then a colony forming unit (CFU) was measured to evaluate an antibacterial/sterilizing activity. The number of measured microorganisms was converted to a common logarithmic number (Log 10), and the difference in the numbers of microorganisms between groups was verified by a one-way analysis of variance and Dunnett's multiple comparison test. The statistical significance of the untreated control was expressed as ***p<0.001. When statistical significance was shown, the degree of decrease compared to the control was indicated by a common log number. The results are shown in FIG. 4.

Figure 4:
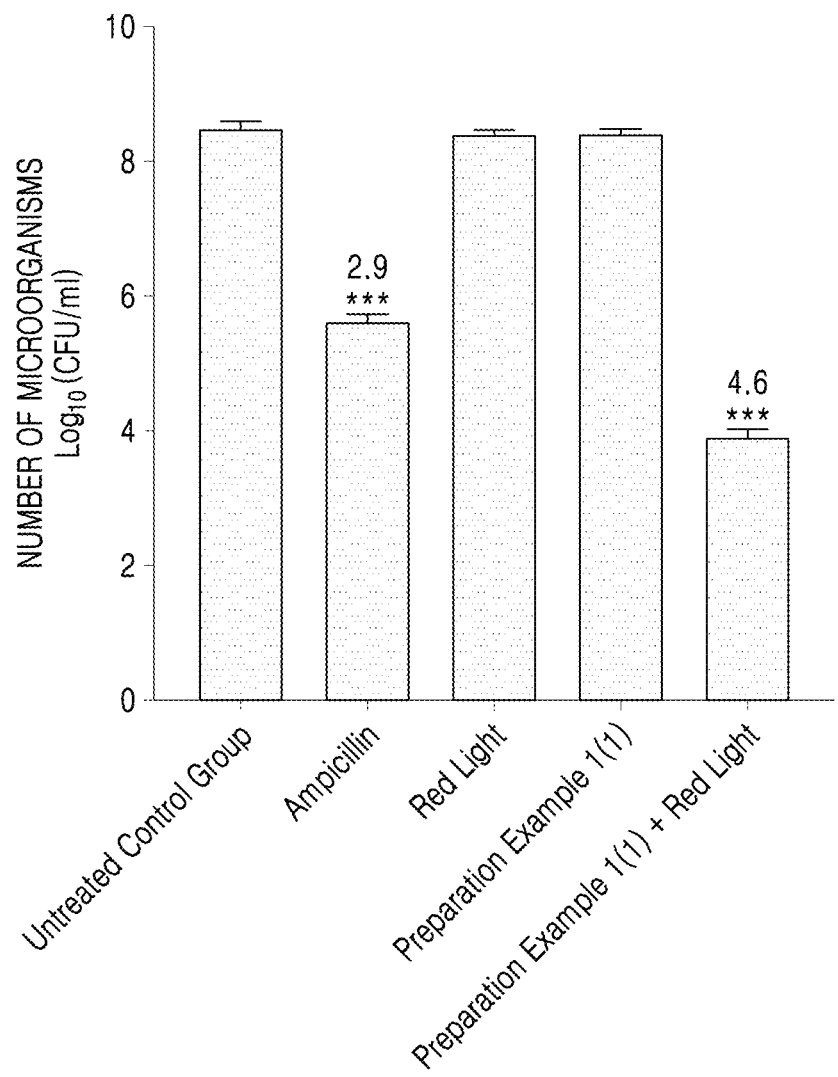
FIG. 4 shows the results obtained by measuring, with respect to *Staphylococcus aureus* KCTC1916, the antibacterial/sterilization activity of an untreated control group, an ampicillin-treated group, a group treated with red light alone, a group treated with a *Ligularia fischeri* ethanol extract according to Preparation Example 1(1) alone, and a group treated with a *Ligularia fischeri* ethanol extract according to Preparation Example 1(1) treated with red light.

Referring to FIG. 4, it can be seen that, compared to the untreated control group, *Staphylococcus aureus* KCTC1916, the case in which the Ligularia fischeri ethanol extract according to Preparation Example was treated with red light, showed a distinguishable antibacterial/sterilizing ability. In comparison, no antibacterial/sterilizing ability was exhibited when only red light was treated or only the *Ligularia fischeri* ethanol extract according to Preparation Example 1(1) was treated alone.

From this, it can be confirmed that the growth of Staphylococcus aureus, which is a Gram-positive bacterium, can be effectively suppressed when the Ligularia fischeri ethanol extract according to Preparation Example 1(1) was treated with red light.

Evaluation Example 5: Measurement of Antibacterial/Sterilization Activity Against Methicillin-Resistant *Staphylococcus aureus* (MRSA)

A culture prepared by inoculating Methicillin-resistant *Staphylococcus aureus* (MRSA) 2659 to a LB medium was diluted using the LB medium so as to have an absorbance (OD 600 nm) of 0.05, and then 0.1% of dimethyl sulfoxide was administered as an untreated control group, or 20 µg/mL of the *Ligularia fischeri* ethanol extract according to Preparation Example 1(1) and 100 µg/mL of vancomycin were each administered, and the cultures were incubated at room temperature for 30 minutes using a stirrer. Then, 100 µL of each culture was transferred to a 96-well plate, and then 120±20 W/m$^2$ of LED red light (wavelength: 660 nm) was irradiated for 15 minutes. Each of the treated cultures was diluted, plated on LB medium, incubated at 37° C., and then a colony forming unit (CFU) was measured to evaluate an antibacterial/sterilizing activity. The number of measured microorganisms was converted to a common logarithmic number (Log 10), and the difference in the numbers of microorganisms between groups was verified by a one-way analysis of variance and Dunnett's multiple comparison test. The statistical significance of the untreated control was expressed as ***p<0.001. When statistical significance was shown, the degree of decrease compared to the control was indicated by a common log number. Results are shown in FIG. 5.

Figure 5:
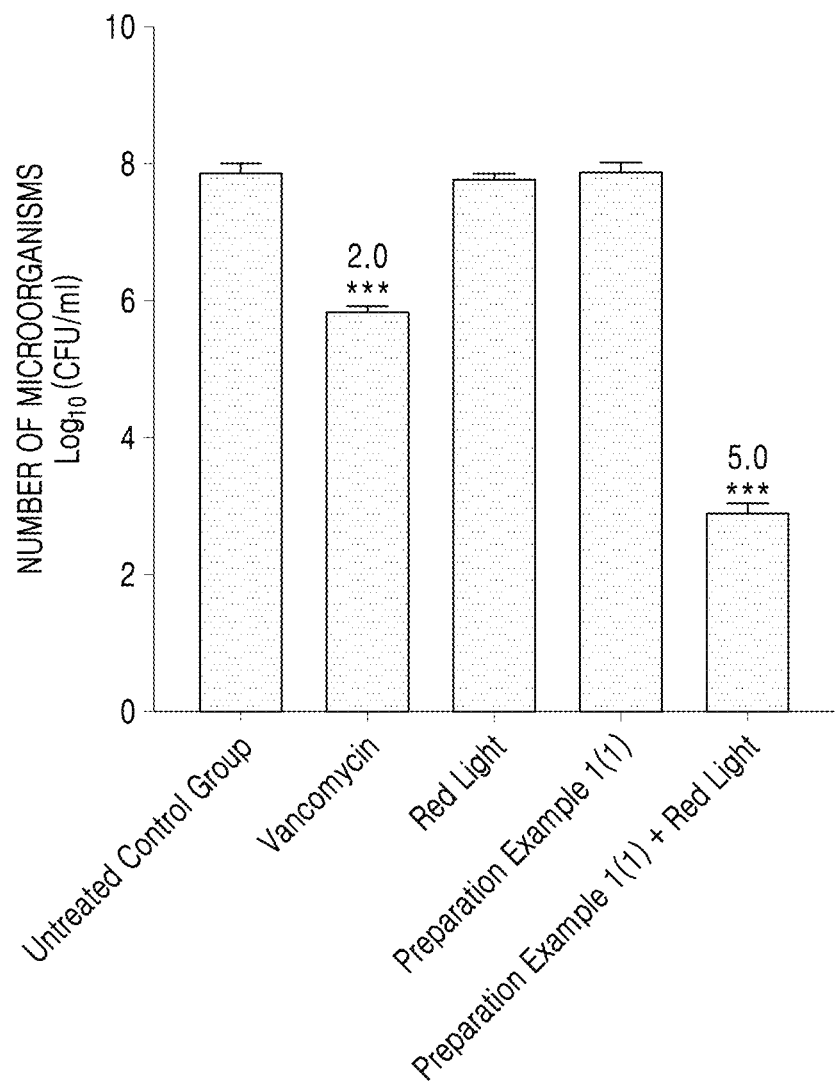
FIG. 5 shows the results obtained by measuring, with respect to methicillin-resistant *Staphylococcus aureus* (MRSA), the antibacterial/sterilization activity of an untreated control group, a vancomycin-treated group, a group treated with red light alone, a group treated with a *Ligularia fischeri* ethanol extract according to Preparation Example 1(1) alone, and a group treated with a *Ligularia fischeri* ethanol extract according to Preparation Example 1(1) treated with red light.

Referring to FIG. 5, as compared to the untreated control group, methicillin-resistant *Staphylococcus aureus* (MRSA) 2659, the case in which the *Ligularia fischeri* ethanol extract according to Preparation Example 1(1) was treated with red light, showed the distinguishable antibacterial/sterilizing ability. In comparison, when only red light was treated or only the Ligularia fischeri ethanol extract according to Preparation Example 1 (1) was treated, no antibacterial/sterilizing ability was exhibited.

From this, it can be confirmed that the growth of *Staphylococcus aureus* that is resistsant to antibiotics can be effectively suppressed when the *Ligularia fischeri* ethanol extract according to Preparation Example 1(1) was treated with red light.

Evaluation Example 6: Measurement of Antibacterial/Sterilization Activity Against *Pseudomonas aeruginosa*

A culture prepared by inoculating *Pseudomonas aeruginosa* PAO1, which is a gram-negative bacterium, into a LB medium was diluted using a LB medium so as to have an absorbance (OD 600 nm) of 0.01, and then 0.1% of dimethyl sulfoxide was administered thereto as a untreated control group, or 50 µg/mL of a *Ligularia fischeri* ethanol extract according to Preparation Example 1(1) and 100 µg/mL of gentamicin were each administered, and the cultures were incubated at room temperature for 1 hour using a stirrer. Then, 100 µL of each culture was transferred to a 96-well plate, and then 600±20 W/m$^2$ of LED red light (wavelength: 660 nm) was irradiated for 1 hour. Each of the treated cultures was diluted, plated on LB medium, and incubated at 37° C., and then a colony forming unit (CFU) was measured to evaluate an antibacterial/sterilizing activity. The number of measured microorganisms was converted to a common logarithmic number (Log 10), and the difference in the numbers of microorganisms between groups was verified by a one-way analysis of variance and Dunnett's multiple comparison test. The statistical significance of the untreated control was expressed as ***p<0.001. When statistical significance was shown, the degree of decrease compared to the control was indicated by a common log number. The results are shown in FIG. 6.

Figure 6:
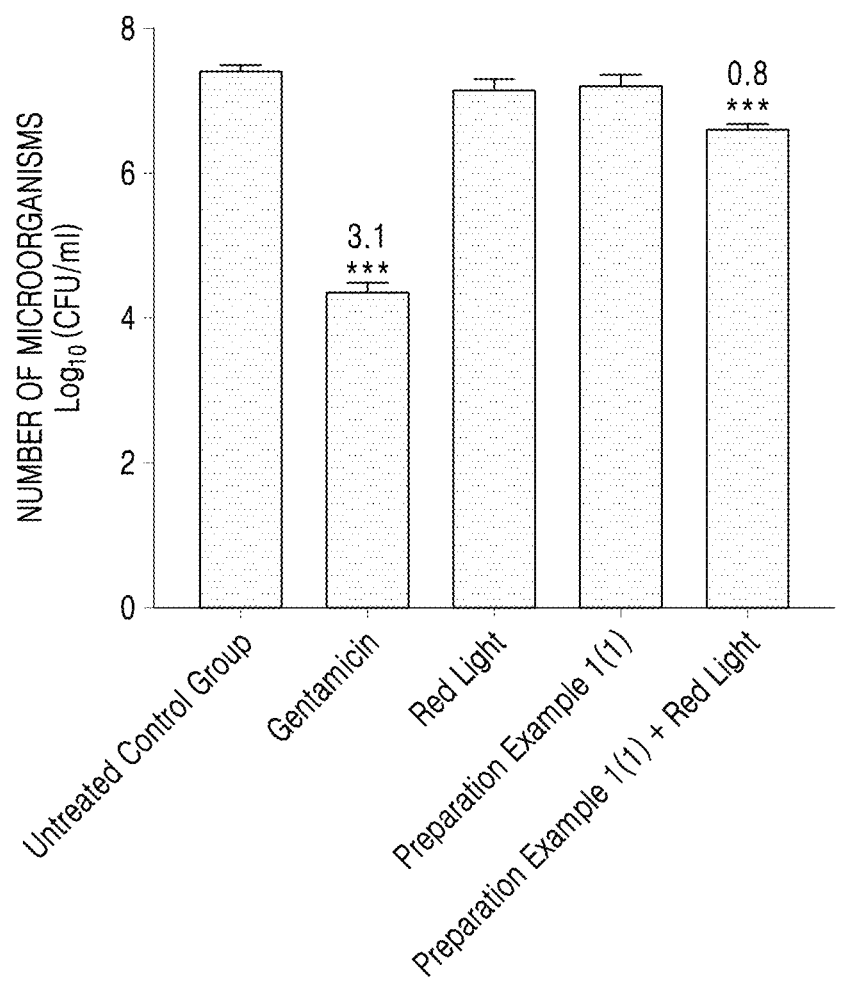
FIG. 6 shows the results obtained by measuring, with respect to *Pseudomonas aeruginosa* PAO1, the antibacterial/sterilization activity of an untreated control group, a gentamicin-treated group, a group treated with red light alone, a group treated with a *Ligularia fischeri* ethanol extract according to Preparation Example 1(1) alone, and a group treated with a *Ligularia fischeri* ethanol extract according to Preparation Example 1(1) treated with red light.

Referring to FIG. 6, it can be seen that, compared to the untreated control group, *Pseudomonas aeruginosa* PAO1, the case in which the *Ligularia fischeri* ethanol extract according to Preparation Example 1(1) was treated with red light, showed a distinguishable antibacterial/sterilizing ability. In comparison, when only red light was treated or only the *Ligularia fischeri* ethanol extract according to Preparation Example 1 (1) was treated, no antibacterial/sterilizing ability was exhibited.

From this, it can be confirmed that the growth of *Pseudomonas aeruginosa*, which is a pathogenic Gram-negative bacterium, can be effectively suppressed when the *Ligularia fischeri* ethanol extract according to Preparation Example 1(1) was treated with red light.

Evaluation Example 7: Measurement of Antibacterial/Sterilization Activity Against *Candida albicans*

A culture prepared by inoculating *Candida albicans* KCTC7965, which is a pathogenic fungus, into a Sabouraud dextrose (SB) was diluted using a SB medium so as to have an absorbance (OD 600 nm) of 0.03, and then 0.1% of dimethyl sulfoxide was administered thereto as a untreated control group, or 50 μg/mL of a Ligularia fischeri ethanol extract according to Preparation Example 1(1) and 20 μg/mL of nystatin were each administered, and the cultures were incubated at room temperature for 1 hour using a stirrer. Then, 100 μL of each culture was transferred to a 96-well plate, and then 600±20 W/m$^2$ of LED red light (wavelength: 660 nm) was irradiated for 15 minutes. Each of the treated cultures was diluted, plated on SB medium, and incubated at 37° C., and then a colony forming unit (CFU) was measured to evaluate an antibacterial/sterilizing activity. The number of measured microorganisms was converted to a common logarithmic number (Log 10), and the difference in the numbers of microorganisms between groups was verified by a one-way analysis of variance and Dunnett's multiple comparison test. The statistical significance of the untreated control was expressed as ***p<0.001. When statistical significance was shown, the degree of decrease compared to the control was indicated by a common log number. The results are shown in FIG. 7.

Figure 7:
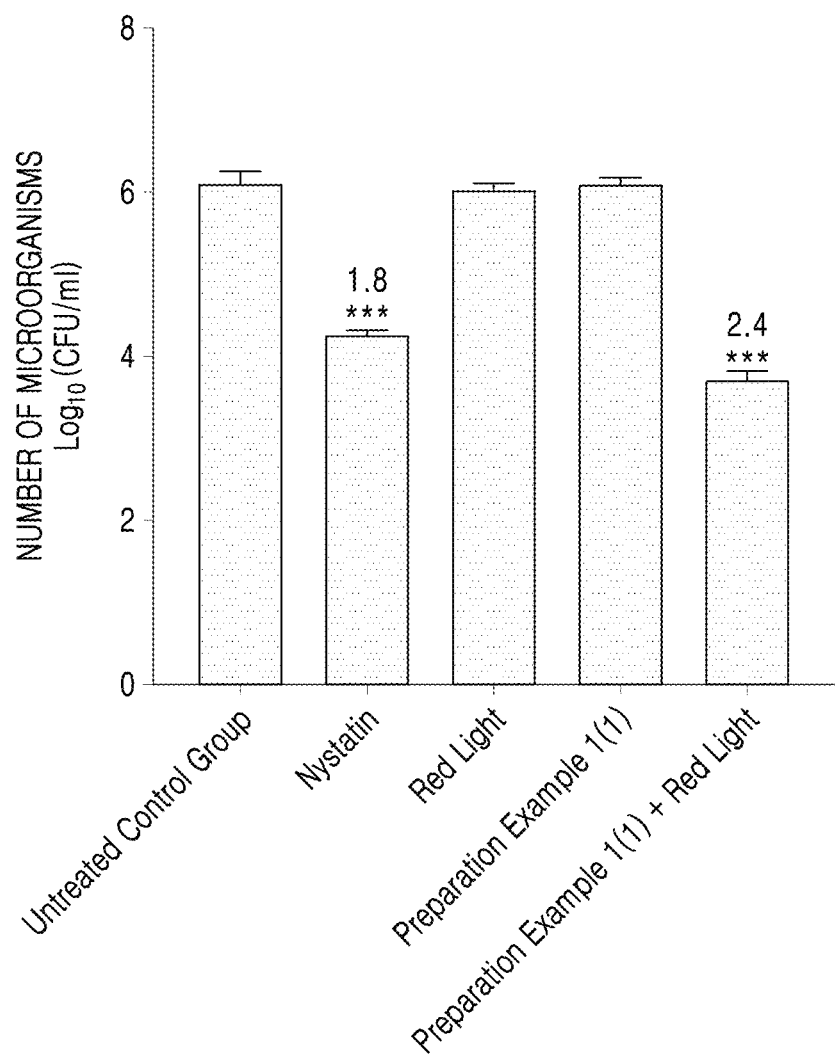
FIG. 7 shows the results obtained by measuring, with respect to *Candida albicans*, the antibacterial/sterilization activity of an untreated control group, a nystatin-treated group, a group treated with red light alone, a group treated with a *Ligularia fischeri* ethanol extract according to Preparation Example 1(1) alone, and a group treated with a *Ligularia fischeri* ethanol extract according to Preparation Example 1(1) treated with red light.

Referring to FIG. 7, compared to the untreated control *Candida albicans* KCTC7965, the case in which the *Ligularia fischeri* ethanol extract according to Preparation Example 1(1) was treated with red light, showed a distinguishable antibacterial/sterilizing ability. In comparison, when only red light was treated or only the *Ligularia fischeri* ethanol extract according to Preparation Example 1(1) was treated, no antibacterial/sterilizing ability was exhibited.

From this, it can be confirmed that the growth of *Candida albicans*, which is a pathogenic fungus, can be effectively suppressed when the Ligularia fischeri ethanol extract according to Preparation Example 1(1) was treated with red light.

Evaluation Example 8: Measurement of Singlet Oxygen Production Ability of *Ligularia fischeri* Extract According to by Light Wavelength The following experiments were performed to confirm singlet oxygen production ability of the *Ligularia fischeri* ethanol extract according to Preparation Example 1(1) under various light irradiation conditions.

The *Ligularia fischeri* ethanol extract according to Preparation Example 1(1) was dissolved in water and dimethyl sulfoxide at a mixing ratio of 1:1 and then distributed to a 96-well plate. A 25 mM sodium phosphate buffer (pH=7.0) prepared by mixing 25 mM potassium phosphate monobasic and 25 mM calcium phosphate dibasic, was used to dissolve N,N-dimethyl-4-nitrosoaniline (RNO) and L-histidine. 40 μL of 62.5 mM L-histidine, 40 μL of 12.5 mM RNO, and 80 μL of sodium phosphate buffer were added to the 96-well plate and stirred, and then absorbance thereof was measured at 440 nm. Light sources of various wavelengths (660 nm, 530 nm, 450 nm, 360 nm, 280 nm) were irradiated for 30 minutes and then the absorbance at 440 nm was remeasured, and the difference in absorbance was calculated as singlet oxygen production capacity. In this regard, 50 μM rosebengal, which was known to effectively produce singlet oxygen, was used as a positive control, and 50 μm 1,4-diazabicyclo [2.2.2]octane (DABCO) was set as a negative control. The experimental results are shown in FIG. 8.

Figure 8:
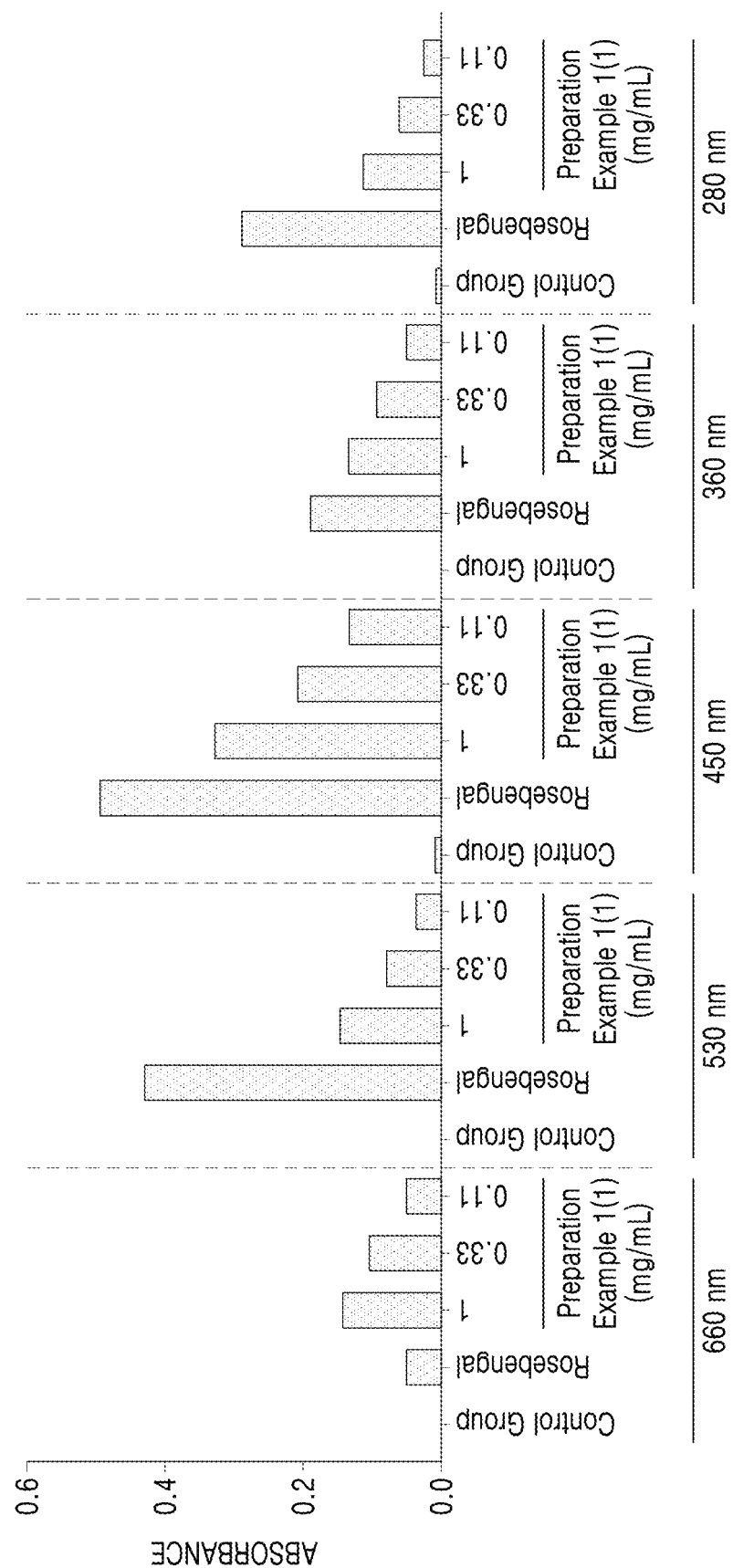
FIG. 8 shows measurement results of singlet oxygen generation capacity of a *Ligularia fischeri* ethanol extract according to Preparation Example 1(1) according to wavelengths of light (660 nm, 530 nm, 450 nm, 360 nm, and 280 nm)

Referring to FIG. 8, it can be seen that the *Ligularia fischeri* ethanol extract according to Preparation Example 1(1) exhibits a distinguishable photodynamic activity with respect to a light source having the wavelength of 280 nm and 660 nm.

From this, it can be seen that the Ligularia fischeri ethanol extract according to Preparation Example 1(1) can be applied to a commercially available LED mask product in which light having the wavelength of 630 nm to 690 nm is irradiated onto the skin.

Evaluation Example 9: Measurement of Antibacterial/Sterilization Activity Against Acne Bacteria (*Cutibacterium acnes*) Using Low-Intensity Light (1)

*C. acnes* culture were freshly made in BHI broth at 37° C. in anaerobic conditions. Then, OD value was adjusted to be 0.01 by dilution with fresh BHI broth media. Ampicillin (100 μg/mL) was used as positive control. Preparation Example 1(1) at the final concentrations 20 μg/mL was added to the bacterial culture. Then, they were incubated at room temperature for 30 min in shaker at 150 rpm. 100 μL of treated sample was transferred to 96 well plate, and red light (660 nm) with different intensities (20 or 1 W/m$^2$) were exposed for 10 or 30 min in a closed chamber. After irradiation, the samples were diluted and CFU/mL were determined. Differences in the number of microorganisms between groups were verified by one-way analysis of variance and Dunnett's multiple comparison test. Statistical significance with the untreated control was indicated by p<0.01, *p<0.001. The case where there was no statistical significance with the untreated control group was indicated by ns. When statistical significance was shown, the degree of decrease compared to the control was indicated by a common log number. The results are shown in FIG. 9.

Figure 9:
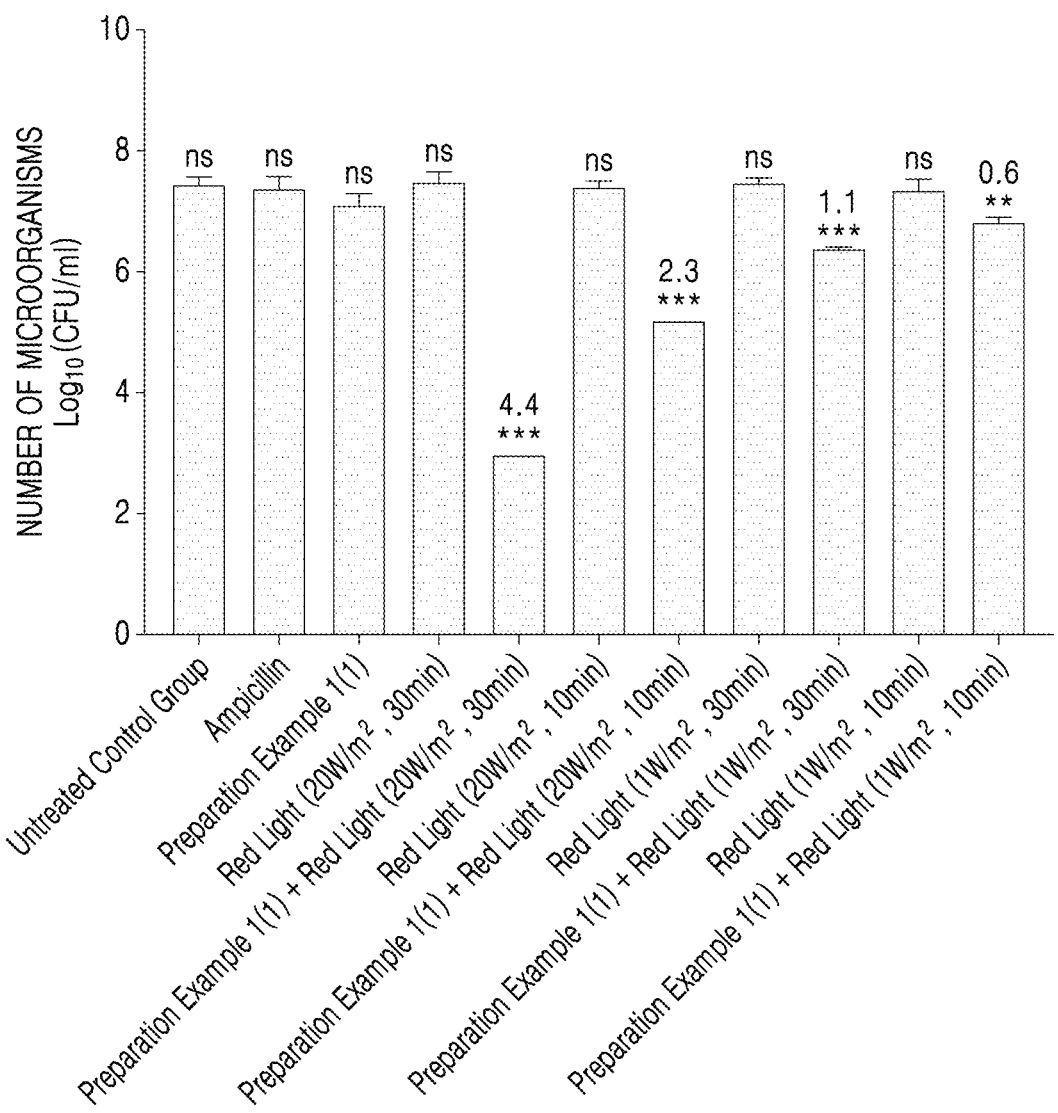
FIG. 9 shows the results obtained by measuring, with respect to *Cutibacterium acnes* KCTC3314, the antibacterial/sterilization activity of an untreated control group, a group treated with red light alone, a group treated with a *Ligularia fischeri* ethanol extract according to Preparation Example 1(1) alone, and a group treated with a *Ligularia* fischeri ethanol extract according to Preparation Example 1(1) treated with red light, under the condition of irradiation with light of low luminous intensity (1 W/m$^2$, 20 W/m$^2$) for 10 minutes or 30 minutes.

Referring to FIG. 9, compared to the untreated control acne bacteria *Cutibacterium acnes* KCTC3314, the case in which the *Ligularia fischeri* ethanol extract according to Preparation Example 1(1) was treated with low light intensity (1, 20 W/m$^2$) of red light, showed a distinguishable antibacterial/sterilizing ability. In comparison, no antibacterial/sterilizing ability was exhibited when only red light was treated or only the *Ligularia fischeri* ethanol extract according to Preparation Example 1(1) was treated alone.

From this, it can be confirmed that the Ligularia fischeri ethanol extract according to Preparation Example 1(1) is effective for controlling acne bacteria even when treated with low light intensity (1, 20 W/m$^2$) of red light.

Evaluation Example 10: Measurement of Antibacterial/Sterilization Activity Against Acne Bacteria (*Cutibacterium acnes*) Using Low-Intensity Light (2)

*C. acnes* culture were freshly made in BHI broth at 37° C. in anaerobic conditions. Then, OD value was adjusted to 0.01 by dilution with fresh BHI broth media. Ampicillin (100 µg/mL) was used as a positive control. Preparation Example 1(1) or Preparation Examples 2 to 5 at the final concentrations 20 µg/mL was added to the bacterial culture. Then, they were incubated at room temperature for 30 min in shaker at 150 rpm. 100 µL of treated sample was transferred to 96 well plate, and red light (660 nm, 20 W/m$^2$) were exposed for 10 or 30 min in a closed chamber. After irradiation, the samples were diluted and CFU/mL were determined. Differences in the number of microorganisms between groups were verified by one-way analysis of variance and Dunnett's multiple comparison test. The statistical significance of the untreated control was expressed as ***p<0.001. The case where there was no statistical significance with the untreated control group was indicated by ns. When statistical significance was shown, the degree of decrease compared to the control was indicated by a common log number. The results are shown in FIG. 10.

Referring to FIG. 10, compared to the untreated control acne bacteria *Cutibacterium acnes* KCTC3314, the case in which the *Ligularia fischeri* fraction according to Preparation Example 2 was treated with low light intensity (20 W/m$^2$) of red light, showed a distinguishable antibacterial/sterilizing ability. In comparison, no antibacterial/sterilizing ability was exhibited when only red light was treated or only *Ligularia fischeri* fractions 1 to 4 according to Preparation Examples 2 to 5 were treated alone.

From this, it can be confirmed that Ligularia fischeri fractions 1 to 4 according to Preparation Examples 2 to 5 is effective for controlling acne bacteria even when treated with low light intensity (20 W/m$^2$) of red light.

Evaluation Example 11: Determination of Antimicrobial Photodynamic Therapy Effect on a Micropig Skin Model To confirm the photodynamic killing bacteria treatment effect on the pig skin, acne bacteria count CFU measurement and stamping method were performed on the skin of a micropig. Skin of micropig were purchased from APURES Co., Ltd. (Pyeongtaek, South Korea).
[CFU Determination]
The pig skins were wiped with alcohol and exposed to UV light for 20 min for sterilization. *C. acnes* culture were freshly made in BHI broth at 37° C. in anaerobic conditions. Then OD value was adjusted to 0.001 by dilution with fresh BHI broth media. Preparation Example 1(1) at the final concentrations 20 µg/m L, or ampicillin (100 µg/mL, a positive control) was added to the bacterial culture. Then, the bacterial culture was incubated at room temperature for 30 min in shaker at 150 rpm. After then, 5 µL of bacterial sample from each sample treatment were coated on pig skin pieces and let the same dry. Red light (660 nm, 20±20 W/m2) were exposed to pig skins for 30 min in a closed chamber. After irradiation, the CFU in each samples were determined by using moisture swab on pig skin. The head of swabs was immersed in PBS to release the bacteria. The samples were diluted and CFU/mL was determined, and CFU/cm$^2$ of pig skin was calculated. Differences in the number of microorganisms between groups were verified by one-way analysis of variance and Dunnett's multiple comparison test. The statistical significance of the untreated control was expressed as ***p<0.001. When statistical significance was shown, the degree of decrease compared to the control was indicated by a common log number. The results are shown in FIG. 11A.

Referring to FIG. 11A, the number of acne bacteria CFU of the group treated with the fungal ethanol extract according to Preparation Example 1(1) treated with red light was the smallest.
[Stamping Method]
The pig skins were wiped with alcohol and exposed to UV light for 20 min. C. acnes culture were freshly made in BHI broth media at 37° C. in anaerobic conditions. Then OD value was adjusted to be 0.01 by dilution with fresh BHI broth media. Preparation Example 1(1) at the final concentrations 20 µg/mL or ampicillin (100 µg/mL, a positive control) was added to the bacterial culture. Then, the bacterial culture was incubated at room temperature for 30 min in shaker at 150 rpm. 10 µL of bacterial sample from each sample treatment was coated on pig skin pieces and let the same dry. Red light (660 nm, 20±20 W/m$^2$) was exposed to pig skins for 30 min in a closed chamber. After irradiation, the samples were stamp on BHI agar plate. The pictures of C. acnes bacterial colony on plates were taken after 3 day of incubation. The results are shown in FIG. 11B.

Referring to FIG. 11B, it can be seen that compared with a micropig skin coated with an untreated control, *C. acnes* KCTC3314, the case in which the *Ligularia fischeri* ethanol extract according to Preparation Example 1 (1) was treated with red light (660 nm, 20 W/m$^2$) showed a distinguishable antibacterial/sterilizing efficacy. In comparison, when the *Ligularia fischeri* ethanol extract according to Preparation Example 1(1) was used alone, the antibacterial/sterilizing efficacy was not shown.

From this, it can be confirmed that the *Ligularia fischeri* ethanol extract according to Preparation Example 1(1) is effective for controlling acne bacteria present in the pig skin even when treated with low light intensity (20 W/m$^2$) of red light. This clearly shows that the antibacterial/sterilization effect is pronounced not only in laboratory tests but also in porcine skin similar to that of the actual human body.

Evaluation Example 12: In Vivo *Staphylococcus aureus* KCTC 3881 Infection in the Mouse Splinted Excisional Wound Model Animal experiments were performed to confirm the wound healing effect on *Staphylococcus aureus*. The results are shown in FIGS. 12A, 12B, 13, 14, 15A, and 15B.

Specifically, animal experiments proceeded as follows.

A 7-week-old male BALB/c mouse (BALB-cAnNCr1jOri, Orientbio, Seongnam, South Korea) was housed for a week in a sterile animal room (SPF, Specific pathogen free) with a controlled air temperature of 22±2° C., a humidity of 50±10%, and the cycle of 12 hours of light and 12 hours of dark. The mice were anesthetized through an avertin intraperitoneal injection, a 5 mm wound was made therein using a biopsy patch, and a central portion of silicone drilled to an outside diameter of 15 mm and an inside diameter of 5 mm was stuck to fit the wound. Then, in the case of the experimental group, 10 μL of a physiological buffer solution (PBS) containing $10^9$ CFU/mL of Staphylococcus aureus KCTC 3881 (S.A. bacterium) was inoculated into the wound site, which was then clogged with Tegaderm, and the back of the mice was wrapped with a compression bandage so that the wound site was not in contact with the outside.

Two days after the infection with *Staphylococcus aureus*, in the case of the group treated with *Ligularia fischeri* ethanol according to Preparation Example 1(1), the wound was treated with 10 μL of a *Ligularia fischeri* ethanol extract (20 μg/mL), and in the case of the red light treated group, the wound was treated with red light LED (wavelength: 660 nm, 120 W/m²) for 15 minutes. In addition, in the case of the Ligularia fischeri ethanol extract according to Preparation Example 1(1) and the red light-treated group, 10 μL of the *Ligularia fischeri* ethanol extract (20 μg/mL) was treated on the wound for 30 minutes and then red light (120 W/m²) was treated for 15 minutes. As a positive control group, in the case of the ampicillin treated group, the wound was treated with 10 μL of ampicillin (100 μg/mL).

The wound was treated in the same manner as above, even 4, 6, and 8 days after infection with *Staphylococcus aureus*, and the image of the wound site was obtained on Day 2, 4, 6, and 8 after infection with *Staphylococcus aureus*. The width and height of the wound site were measured using a caliper and the product obtained by multiplying the width with the height was used to calculate the wound size in mm². Wound size (mm²): Length(mm)×Width (mm)

A wound size measurement is a measurement of apparently appearing wound scab and requires the task of histologically confirming whether the wound has been closed by an epidermis actually newly created inside the scab. To this end, the distance between the wound epidermis was measured. Eight days after the infection with *Staphylococcus aureus*, the wound tissue was removed and fixed in 4% paraformaldehyde for 4 hours. The fixed wound tissue was placed on a slide and subjected to Hemaxylin and Eosin (H&E) staining, and microscopic photography was performed using Olympus microscope (CX43) and Cellsense standard (Olymphus, Japan) software, and the degree of wound closure was confirmed by measuring the distance between the epidermis tips. FIG. 12A show images of a wound obtained by photographing a wound site on Days 0, 2, 4, 6, and 8 before the wound is infected with *Staphylococcus aureus*, with respect to Control (PBS), the group treated with a *Ligularia fischeri* ethanol extract according to Preparation Example 1(1), the group treated with red light, the group treated with a *Ligularia fischeri* ethanol extract according to Preparation Example 1(1) and red light, and the ampicillin-treated group. FIG. 12B show images of a wound obtained by photographing a wound site on Days 0, 2, 4, 6, and 8 after the wound is infected with *Staphylococcus aureus*, with respect to Control (S.A. bacteria), the group treated with a *Ligularia fischeri* ethanol extract according to Preparation Example 1(1), the group treated with red light, the group treated with a *Ligularia fischeri* ethanol extract according to Preparation Example 1(1) and red light, and the ampicillin-treated group. FIG. 13 shows the change in the wound size with respect to, on Day 0, 2, 4, and 6, the control (PBS)-treated group, the S. A. bacteria-treated group, the group treated with S.A. bacteria+Preparation Example 1(1)+red light, and the group treated with S.A. bacteria+ampicillin-treated group. FIG. 14 shows the change in the wound size of the control (PBS)-treated group, the group treated with a *Ligularia fischeri* ethanol extract according to Preparation Example 1(1)(PBS+Preparation Example 1(1)), the group treated with red light (PBS+red light), the group treated with a Ligularia fischeri ethanol extract according to Preparation Example 1(1) and red light(PBS+Preparation Example1(1)+red light), and the ampicillin-treated group (PBS+Ampicillin) on Day 8 before the wound is infected with *Staphylococcus aureus*, and the change in the wound size of the S. A., the group treated with a *Ligularia fischeri* ethanol extract according to Preparation Example 1(1)(S.A-.bacteria+Preparation Example 1(1)), the group treated with red light (S.A.bacteria+red light), the group treated with a *Ligularia fischeri* ethanol extract according to Preparation Example 1(1) and red light (S.A.bacteria+Preparation Example 1(1)+red light), and the ampicillin-treated group (S.A.bacteria+Ampicillin) on Day 8 after the wound is infected with *Staphylococcus aureus* (S.A.bacteria). The statistical significance of mouse animal test data was verified through Student's t-test. At this time, statistical significance between Control (PBS) and S. A. bacteria-treated group was expressed as $^{\#\#\#}p<0.001$. Statistical significance with S. A. bacteria-treated group-treated group was expressed as *p<0.05 or *p<0.01. FIGS. 15A and 15B show microphotographs and wound closure measurements of wound tissue from wound tissue paraffin blocks stained by H&E staining obtained from mice on day 8 of the wound experiment. The statistical significance of mouse animal test data was verified through Student's t-test. At this time, statistical significance of S. A. bacteria-treated group was expressed as $^{\#\#}p<0.001$. Statistical significance of S. A. bacteria-treated group was expressed as *p<0.05. Black bar represents 200 μm in scale bar, the yellow bar represents wound length, and the dotted line represents epidermis.

Referring to FIGS. 12A, 12B, and 14, it was confirmed that in the case of the control (PBS)-treated group, the group treated with PBS+Preparation Example 1(1), the group treated with PBS+red light, the group treated with PBS+Preparation Example1(1)+red light, and the group treated with PBS+ampicillin, the change in wound size did not occur over time. On Day 8, the wound size of the control (PBS)-treated group and the wound size of the S. A. bacteria-treated group were 30.1% and 80.5% of the initial wound size, respectively. That is, the S. A. bacteria-treated group showed a substantial decrease in the wound recovery rate, compared to Control(PBS). In addition, the wound sizes of the group treated with S.A. bacteria+Preparation Example 1(1), the group treated with S.A. bacteria+red light, the group treated with S.A. bacteria+Preparation Example1(1)+red light, and the group treated with S.A. bacteria+ampicillin were 53.7%, 59.1%, 36.9%, and 53.7% of the initial wound size. There was no significant difference in wound size in the case of the group treated with S.A. bacteria+red light and the group treated with S.A. bacteria+ampicillin, compared to the group treated with S.A. bacteria. However, in the case of the group treated with S.A. bacteria+Preparation Example 1(1) and the group treated with S.A. bacteria+Preparation Example 1(1)+red light, the wound was relatively small. In particular, in the case of the group treated with S.A. bacteria+Preparation Example 1(1)+red light, the wound size was significantly decreased.

Referring to FIG. 13, the size of the wound was much larger in the S.A. bacteria-treated group, compared to the control (PBS)-treated group. This means that recovery of the wound is slowed by the infection with S.A. bacteria. In the case of the group treated with S.A. bacteria+Preparation Example 1(1)+red light, the wound size was much smaller, and the photodynamic treatment effect of this *Ligularia fischeri* ethanol extract was higher than that of the positive control, the Ampicillin group.

Referring to FIG. 15A, in all of the control (PBS)-treated group, the group treated with PBS+Preparation Example 1(1), the group treated with PBS+red light, the light group treated with PBS+Preparation Example1(1)+red light, and the group treated with PBS+Ampicillin, epidermis was formed, indicating that the wound was completely closed. In comparison, it was confirmed that the wound was not completely closed in the S. A. bacteria-treated group.

Referring to FIG. 15B, with respect to the distance between epithelial tips, the wounds of the S.A. bacteria-treated group, the group treated with S.A. bacteria+Preparation Example 1(1), the group treated with S.A. bacteria+red light, the group treated with S.A. bacteria+Preparation Example1(1)+red light, and the group treated with S.A. bacteria+ampicillin were maintained at as much as 107.7%, 18.4%, 4.6%, and 16.6%, respectively. Unlike the measurement of the scab through the caliper, in the case of the group treated with S.A. bacteria+Preparation Example 1(1), the wound size was not reduced compared to the group treated with S.A. bacteria. In comparison, in the case of the group treated with S.A. bacteria+red light, the group treated with S.A. bacteria+Preparation Example1(1)+red light, and the group treated with S.A. bacteria+ampicillin, the wound size was reduced compared to the S.A. bacteria-treated group. In the case of the group treated with S.A.bacteria+Preparation Example1(1)+red light, the wound size was smallest, and compared with the S.A.bacteria-treasted group, the wound size was significantly decreased.

From this, it can be seen that when *Ligularia fischeri* ethanol extract according to Preparation Example 1(1) and red light were used, the wound of the mouse infected with *S. aureus* bacteria are very effectively restored by the light sterilization treatment effect.

In light treatment using the *Ligularia fischeri* ethanol extract, not only the wound was reduced the fastest, but also the wound closure of the actual wound site was significantly improved, thereby promoting the recovery of wounds infected with *S. aureus* bacteria. The photodynamic therapeutic effect evaluation tests using the *Ligularia fischeri* ethanol extract clearly shows that there is a photodynamic therapeutic effect for wound healing in live mice as well as in vitro tests and pig skin models.

The method of reducing and killing bacteria and fungi according to one aspect includes bringing a composition including a *Ligularia fischeri* extract or a fraction thereof as an active ingredient into contact with cells or tissues of a subject; and irradiating the cells or tissues of the subject in contact with the composition with an absorbable wavelength of excitation light. The composition can eliminate various side effects that antibiotics may exhibit, by using plants with proven safety as raw materials. The composition can inhibit or treat oral disease and periodontal disease, and inhibit the growth of or kill acne and skin harmful bacteria, as well as kill bacteria in food, fruit, meat, fresh meat, water, nutrient solution, container, packaging material, or appliance.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope of the disclosure as defined by the following claims.

What is claimed is:

1. A method of reducing and killing bacteria and fungi, the method comprising:
   bringing a composition including a *Ligularia fischeri* ethanol extract or an ethanolic fraction thereof as an active ingredient into contact with cells or tissues of a subject;
   irradiating cells or tissues of a subject in contact with the composition with an absorbable wavelength of excitation light; and
   irradiating for 1 minute to 15 minutes using a light-emitting diode (LED) lamp with a red light wavelength of 660 nm at an intensity of 1 W/m$^2$ to 600±20 W/m$^2$.

2. The method of claim 1, wherein the LED lamp emits light originating from an LED mask.

3. The method of claim 1, wherein the *Ligularia fischeri* extract is extracted and filtered by:
   adding, to dry, pulverized *Ligularia fischeri*, an ethanolic solvent in an amount 5 to 10 times the dry, pulverized *Ligularia fischeri*, to form a mixture,
   extracting by refluxing the mixture at room temperature for 1 to 10 hours, and
   filtering with a filter paper.

4. The method of claim 1, wherein the composition further comprises one or more carriers or additives selected from: lactose, corn, starch, soybean oil, microcrystalline cellulose, mannitol, magnesium stearate, talc, polyvinylpyrrolidone, hydroxypropylcellulose, carboxymethylcellulose calcium, sodium starch glycolate, polacrilin potassium, crospovidone, white sugar, fructose, sorbitol, aspartame, sodium carboxymethylcellulose, beta-cyclodextrin, white lead, xanthan gum, methyl paraoxybenzoate, propyl paraoxybenzoate, and potassium sorbate.

5. The method of claim 1, wherein the bacteria is selected from *Staphylococcus aureus*, methicillin-resistant *Staphylococcus aureus* (MRSA), *Staphylococcus epidermidis*, *Streptococcus pneumoniae*, *Streptococcus mutans*, *Streptococcus pyogenes*, *Enterococcus faecalis*, *Enterococcus faecium*, *Propionibacterium acnes*, *Cutibacterium acnes*, *Bacillus subtilis*, *Clostridioides difficile*, *Clostridium innocuum*, *Lactobacillus*, *Bifidobacterium*, *Eggerthella*, *Escherichia coli*, *Pseudomonas aeruginosa*, *Neisseria gonorrhoeae*, *Chlamydia trachomatis*, *Yersinia pestis*, *Klebsiella pneumoniae*, *Legionella pneumophila*, *Proteus mirabilis*, *Enterobacter cloacae*, *Serratia marcescens*, *Helicobacter pylori*, *Salmonella enteritidis*, *Salmonella typhimurium*, *Acinetobacter baumannii*, *Vibrio cholera*, *Porphyromonas gingivalis*, *Prevotella intermedia*, *Tannerella forsythia*, *Treponema denticola*, *Fusobacterium nucleatum*, *Aggregatibacter actinomycetemcomitans*, and *Aeromonas hydrophila*.

6. The method of claim 1, wherein the fungi is selected from *Candida* species, *Candida albicans*, *Aspergillus fumigatus*, *Aspergillus flavus*, *Cryptococcus neoformans*, *Histoplasma capsulatum*, *Pneumocystis jirovecii*, *Stachybotrys chartarum*, *Trichophyton rubrum*, *Trichophyton mentagrophytes*, *Epidermophyton floccosum*, *Microsporum gypseum*, *Trichophyton*, *Microsporum*, and *Epidermophyton*.

7. A photodynamic treatment method using the method of claim 1.

8. The photodynamic treatment method of claim 7, wherein the photodynamic treatment method is used to treat dermatoses, acne, pneumonia, sinusitis, urethritis, prostatitis, sepsis, bacteremia, burn infections, wound infections, otitis externa, otitis media, folliculitis, keratitis, atopic dermatitis, endophthalmitis, neopharitis, meningitis, brain tumors, endothelia, endocarditis, vaginitis, dental cariesis, periodontitis, periodontal disease, colitis, enterobacterial infections, or oral bacterial infections.

9. A sterilization method comprising:

bringing a composition including *Ligularia fischeri* or an ethanolic fraction thereof as an active ingredient into contact with food, fruit, meat, fresh meat, water, a nutrient solution, a plant, a crop, a container, a packaging material, or an appliance;

irradiating for 1 minute to 15 minutes using a red light-emitting diode (LED) lamp the food, fruit, meat, fresh meat, water, nutrient solution, container, packaging material, or appliance, which is in contact with the composition, with an absorbable wavelength of excitation light having a wavelength of 660 nm at an intensity of 1 W/m$^2$ to 600±20 W/m$^2$; and reducing and killing bacteria and fungi on the food, fruit, meat, fresh meat, water, nutrient solution, plant, crop, container, packaging material, or appliance irradiated by the excitation light.

10. The sterilization method of claim 9, wherein the *Ligularia fischeri* extract is extracted and filtered by adding, to dry, pulverized *Ligularia fischeri*, an ethanolic solvent thereof in an amount 5 to 10 times the dry, pulverized *Ligularia fischeri*, to form a mixture, and refluxing the mixture at room temperature for 1 to 10 hours.

11. The sterilization method of claim 9, wherein the method is used to sterilize cosmetic containers, food packaging materials, food storage containers, foods, fruits, meats, fresh meat, water, vegetable cultures, horticultural nutrient solutions, plants, crops, toilet equipment, toiletry equipment, sanitary equipment, toothbrushes, combs, scissors, swabs, razors, earplugs, needles, needles for acupuncture, nail clippers, forceps, or kitchen equipment.

* * * * *